(12) United States Patent
Kitajima et al.

(10) Patent No.: US 6,785,411 B1
(45) Date of Patent: Aug. 31, 2004

(54) IMAGE ANALYZING APPARATUS AND IMAGE ANALYZING METHOD

(75) Inventors: Shoko Kitajima, Fukuoka (JP); Hiroshi Shirouzu, Fukuoka (JP); Kanji Yahiro, Onojo (JP); Koji Yamaguchi, Kasuga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 636 days.

(21) Appl. No.: 09/620,648

(22) Filed: Jul. 20, 2000

(30) Foreign Application Priority Data

Aug. 5, 1999 (JP) ............................................ 11-222430
Apr. 21, 2000 (JP) ...................................... 2000-120789

(51) Int. Cl.[7] ............................ G06K 9/00; G06K 9/36; G06K 9/46
(52) U.S. Cl. ....................................... 382/133; 382/240
(58) Field of Search .................................. 382/133, 240

(56) References Cited

U.S. PATENT DOCUMENTS

| | | | |
|---|---|---|---|
| 5,231,580 A | * 7/1993 | Cheung et al. ............. | 382/128 |
| 5,513,273 A | 4/1996 | Ito .............................. | 382/132 |
| 5,598,481 A | 1/1997 | Nishikawa et al. ......... | 382/130 |
| 5,617,143 A | * 4/1997 | Shimokoriyama et al. ..................... | 375/240.02 |
| 5,841,473 A | * 11/1998 | Chui et al. ............... | 348/390.1 |
| 6,025,879 A | * 2/2000 | Yoneyama et al. .... | 375/240.24 |
| 6,148,110 A | * 11/2000 | Yajima et al. ............. | 382/240 |
| 6,292,583 B1 | 9/2001 | Maruo ....................... | 382/149 |
| 6,377,280 B1 | * 4/2002 | Acharya et al. ............ | 345/667 |
| 6,629,015 B2 | * 9/2003 | Yamada ...................... | 700/138 |
| 6,651,008 B1 | * 11/2003 | Vaisberg et al. .............. | 702/21 |

OTHER PUBLICATIONS

European Search Report dated Dec. 18, 2001.

* cited by examiner

*Primary Examiner*—Leo Boudreau
*Assistant Examiner*—H. Akhavannik
(74) *Attorney, Agent, or Firm*—Stevens, Davis, Miller & Mosher, LLP

(57) ABSTRACT

There are provided an image analyzing apparatus and an image analyzing method where, in analyzing a microscopic image of a microbe or a cell tissue, the manpower-independent observation and quantification are executed so as to enhance the analyzing performance. The configuration of the apparatus and the method is as follows: A frequency conversion processing, such as Wavelet transformation, is executed toward the microscopic image of the microbe or the cell tissue and, based on the result obtained, the quantitative analysis is executed. The configuration allows the automatic quantitative judgement to be executed concerning factors such as the position, the number, the magnitude, the degree of activity, the area ratio, the configuration, the direction, and the color. This condition makes it possible to reduce a burden imposed on a person who are in charge of the observation. Also, the noise can be eliminated, which also enhances the analyzing performance. Moreover, the converted regions are utilized for the analysis. This condition makes it possible to execute the analysis with the amount of calculation that is smaller than the resolution, thereby allowing the high-speed processing to be implemented.

2 Claims, 24 Drawing Sheets

× DISCARDED COMPONENT
○ EXTRACTED COMPONENT

ACTIVE REGION

ENLARGED
DIAGRAM

INACTIVE REGION 51,52,53 CELLS
51a,52a,53a DENDRITES

IMAGE ANALYZING APPARATUS AND IMAGE ANALYZING METHOD

BACKGROUND OF THE INVENTION

1. Field of the Invention

The present invention relates to an image analyzing apparatus and an image analyzing method that are utilized for such processing as the image analyzing processing of images of samples such as microbes and cells.

2. Description of the Related Art

In the various kinds of tests performed in the field of biochemistry, cells of animals and plants and microbes are cultured under variety types of conditions, thereby observing the degree of their change and growth associated with a lapse of time. For example, when observing, as observation objects, portions that grow gradually such as a mycelium of a cell, it becomes necessary to perform an operation of tracing the growing portions with a lapse of time and constituting the data on the portions from the recorded observation result thereof. Conventionally, such an operation has been almost entirely dependent on the manpower. Namely, the person taking charge of the experiment has carried out the following operation: The person observes the cell by a visual inspection within the microscope's field of view and, by focusing attention on the observation object portions such as the mycelium, constitutes and records the data on the necessary items. Also, in the case of carrying out the analysis by utilizing the image processing, taking advantage of a luminance of the image for the analysis, the analysis has been performed by providing a threshold value to the light and shade of the luminance. Otherwise, the analysis has been performed that is based on an edge detection of the image.

The manpower-dependent observing operations like this, however, are troublesome operations that necessitate so much labor and time. Accordingly, the observing operations have resulted in a lowering in the efficiency of the whole experimental operation, and at the same time have imposed an excessive operational burden on the person in charge of the experiment. Also, when constituting the data from the observation result, the variation is likely to occur in the resultant data configured, depending on the experience and the degree of proficiency of the respective persons in charge of the observation. Consequently, there has also existed a problem that it is difficult to ensure a reliability of the data. Also, in the case of carrying out the analysis by utilizing the image processing, there have existed problems that, when the analysis is performed with a higher resolution, the calculation time is increased and the analysis itself is deteriorated by the noise.

SUMMARY OF THE INVENTION

It is an object of the present invention to provide an image analyzing apparatus and an image analyzing method that make it possible to analyze images of samples such as microbes and cells at a high speed and with an excellent efficiency as well as with a high reliability.

The present invention is characterized by an image analyzing apparatus and an image analyzing method that include an image inputting member for inputting an image to be analyzed, a frequency converting member for performing a frequency conversion toward the image inputted by the image inputting member, and a member for outputting, based on a conversion result, an analysis result of the image inputted from the image inputting member, the conversion result being obtained by the frequency converting member, wherein features of the image are extracted by frequency-converting horizontal direction data and vertical direction data of the image and by utilizing value of a converted component of each frequency band in a horizontal direction, a vertical direction, or an oblique direction.

Also, the present invention provides an image analyzing apparatus and an image analyzing method that include a band dividing member for frequency-converting cell image data so as to perform a band-division of a frequency component into a high-frequency-side frequency component and a low-frequency-side frequency component that contains a direct current component, and a feature extracting member for extracting a feature portion of a cell from feature-extracting intermediate data created using at least the high-frequency-side frequency component.

DESCRIPTION OF THE EMBODIMENTS

Embodiment 1

Figure 1:
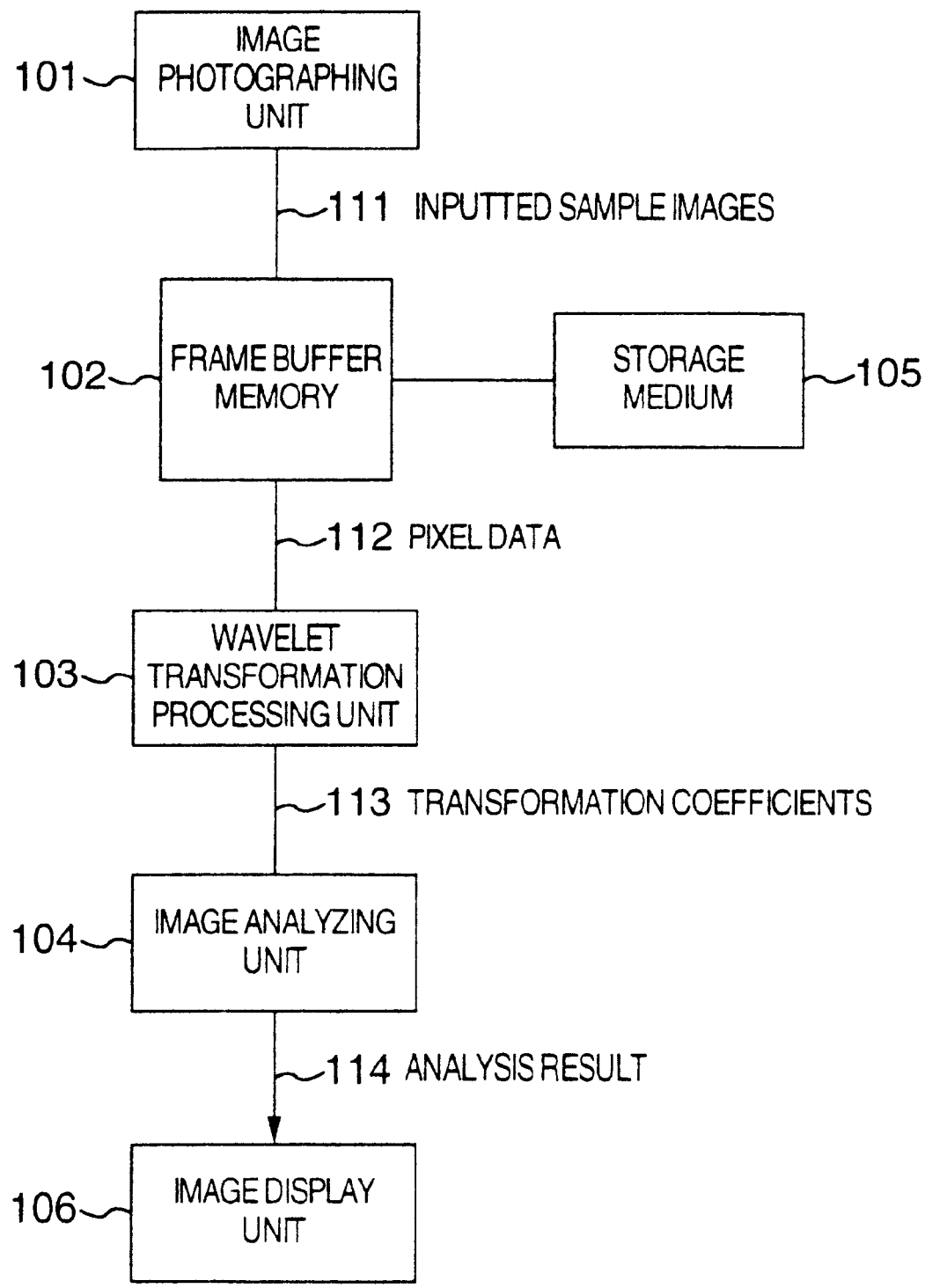
FIG. 1 is a block diagram for illustrating an embodiment as an image analyzing apparatus according to an embodiment 1 of the present invention.

FIG. 1 is a block diagram for illustrating an embodiment as an image analyzing apparatus according to an embodiment 1 of the present invention. A reference numeral 101 denotes an image photographing unit that enlarges microscopic images of microbes and cell tissues with the use of a CCD camera and fetches the enlarged images as digital images through an A/D conversion in an image fetching circuit. A numeral 111 denotes inputted sample images of the microbes and the cell tissues. A numeral 102 denotes a frame buffer memory for storing the photographed image data. A numeral 112 denotes pixel data outputted from the frame buffer memory 102. A numeral 103 denotes a Wavelet transformation processing unit that performs a subband-division toward one screenful of images in a multistage manner by repeating the following processing in several stages: The pixel data 112 is subjected to a band-division by a low pass filter and a high pass filter so as to be divided into its one-half, and further the respective divided one-half data are thinned out down to their one-half, thereby reducing the amounts of the data gradually. A numeral 113 denotes transformation coefficients outputted from the Wavelet transformation processing unit 103. Numerals 104, 114 and 106 denote an image analyzing unit, an analysis result and an image display unit which displays the analysis result, respectively. A numeral 105 denotes a storage medium, such as a hard disk or a CD, that stores a control program, a threshold value, an analysis region, and so on. The control program is designed for an image analysis that follows a flowchart in FIG. 2.

Next, using the flowchart in FIG. 2, the explanation will be given below concerning the processing steps in the image analyzing apparatus of the present invention configured as described above.

At a step 200, the image photographing unit 101 photographs the images of the microbes and the cell tissues. At a step 201, the photographed images are stored into the frame buffer memory 102 as the digital images of the sample images 111.

At a step 202, the image data stored in the frame buffer memory 102 is subjected to the Wavelet transformation in the Wavelet transformation processing unit 103.

At a step 203, in the image analyzing unit 104, the analysis is performed toward the frequency-converted transformation coefficients 113, using the following conditions: Magnitude of the transformation coefficients in frequency regions, which are represented by values obtained by taking absolute values of the component data (the transformation coefficients) in the frequency regions, the directional characteristic represented by magnitude of the same coordinates in a horizontal (LH), vertical (HL), and oblique (HH) region (Namely, of a horizontal direction, a vertical direction, and an oblique direction, which direction component is the most influential ?), and X–Y coordinates indicating, of the image data, which data's component data the transformation coefficients are.

At a step 204, based on this analysis result, quantitative judgement on the degree of activity of the objects, such as the microbes and the cells, is carried out, taking advantage of the position information, the number, the magnitude, the area ratio, the configuration, the direction, and the color. The position information is analyzed, using the coordinates. As for the number, defining magnitude of the value as a threshold value, the number of the observation objects that are larger than the threshold value is calculated. The magnitude of a sample to be observed is calculated from the area that is larger than a certain fixed value. As for the area ratio, defining magnitude of the value as a threshold value, the area ratio is calculated from a rate with which the observation objects larger than the threshold value occupy within the whole regions. The configuration is calculated from the ratio between the horizontal components and the vertical components and the coordinates. The direction is calculated from sum-total of magnitudes of the horizontal, vertical, and oblique components. The color can be calculated from a difference in the colors in the inputted image information. Thus, taking advantage of these calculated values, the quantitative judgement on the degree of activity is carried out. Examples of the degree of activity are as follows: Conversion into numerals of the flattening ratio and the degree of mycelium's growth, and the area ratio of the division, and so on.

There are many cases where, at the step 204, noise components of the images are contained in a stage 0 in FIG. 7. Consequently, by using stages other than the stage 0 concerning an image containing a noise, it becomes possible to perform an analysis where the noise is eliminated. In addition to this, the calculation time becomes shorter because the other stages have less analysis resolution in comparison with the stage 0.

Figure 3:
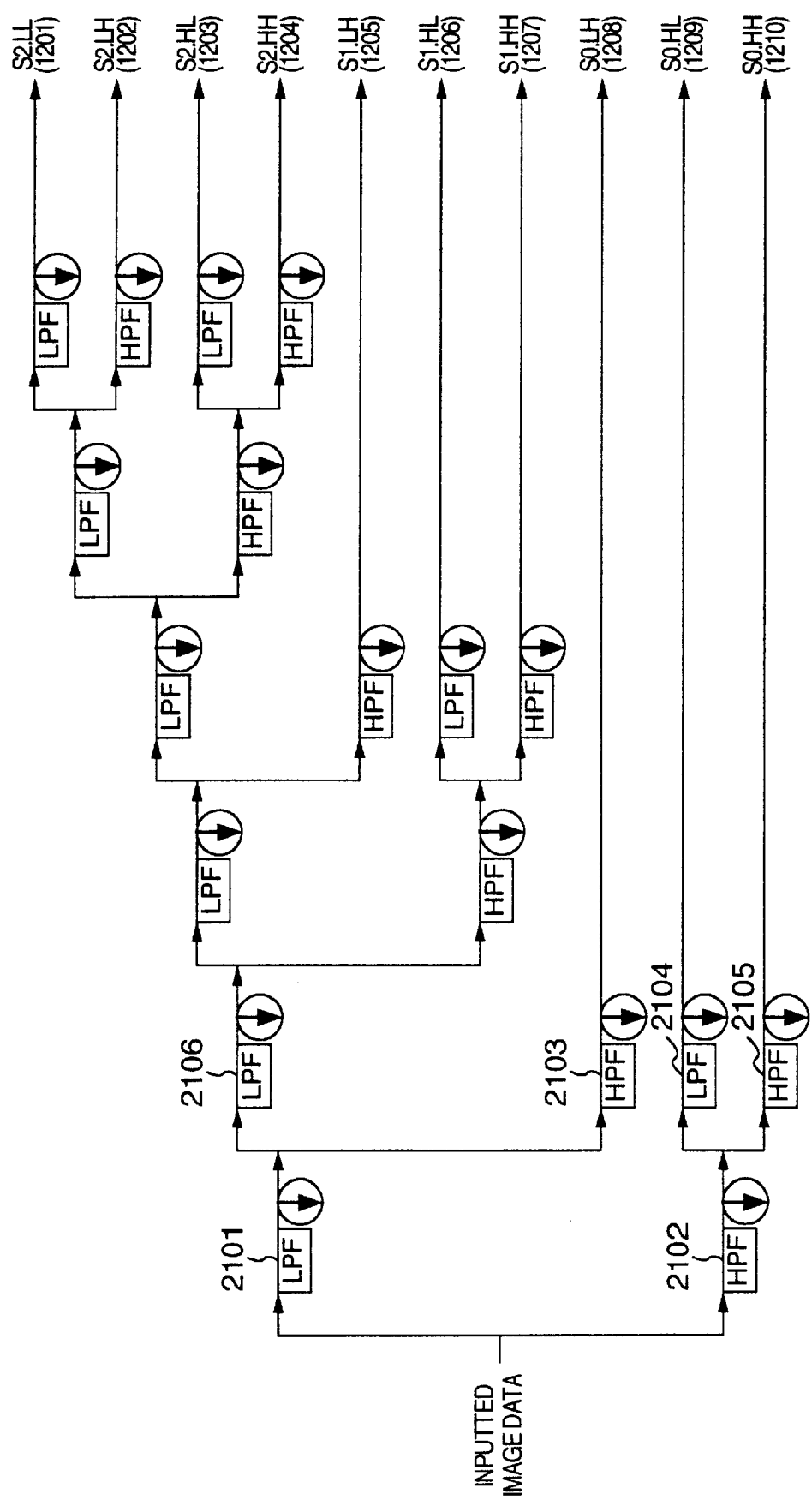
FIG. 3 is a block diagram for explaining Wavelet transformation processing in the embodiment 1 of the present invention.
Figure 4:
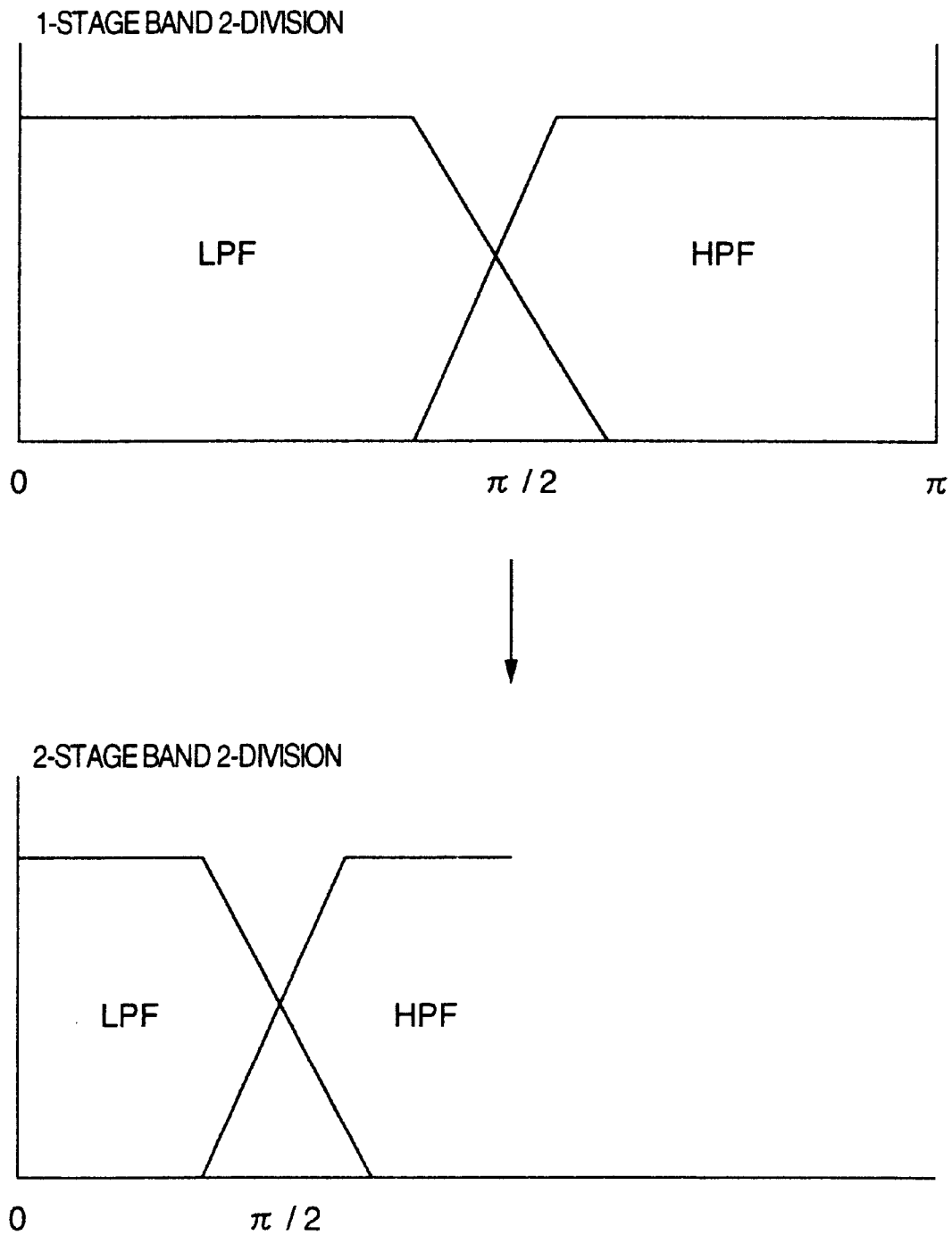
FIG. 4 is an explanatory diagram for explaining 1-stage band 2-division and 2-stage band 2-division in the embodiment 1 of the present invention.
Figure 5:
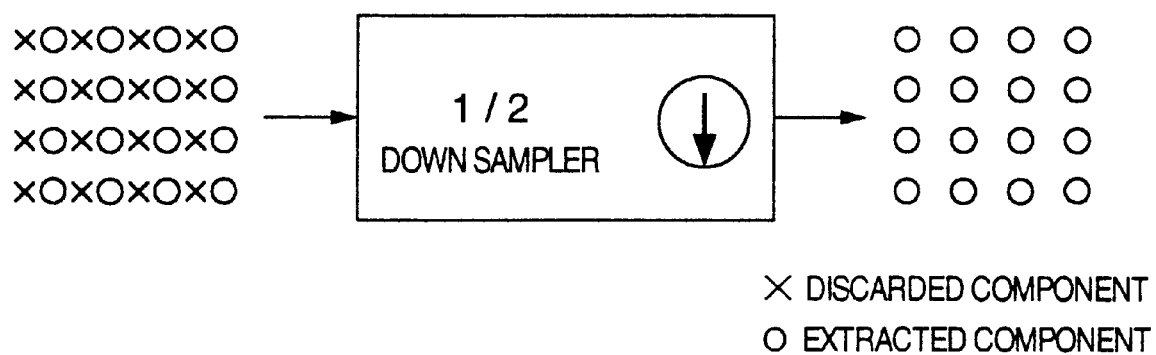
FIG. 5 is an explanatory diagram for explaining a down sampler in the embodiment 1 of the present invention.

Here, the explanation will be given below regarding the Wavelet transformation processing at the step 202 in FIG. 2. FIG. 3 is a block diagram for illustrating the Wavelet transformation processing. The inputted image data of the inputted sample images 111, which has been fetched by the image photographing unit 101, is inputted into a horizontal-direction low pass filter (LPF) and a horizontal-direction high pass filter (HPF), and thereby the horizontal-direction band is divided into two as is illustrated in FIG. 4. After that, by down samplers (downward direction arrows), the data amounts of the respective divided data are each thinned out in time down to their one-half.

The down sampler is a method of reducing an image down to its one-half in size by selecting one pixel out of two pixels within the image. The inputted image data, the data amount of which has been thinned out down to its one-half by being passed through the horizontal-direction LPF, is then inputted into a vertical-direction LPF and a vertical-direction HPF, and thereby the vertical-direction band is divided into two. After that, by down samplers (downward direction arrows), the data amounts of the respective divided one-half data are each thinned out in time down to their one-half.

FIGS. 6A to 6D are explanatory diagrams for explaining the subbands in the embodiment 1 of the present invention. As illustrated in FIGS. 6A to 6D, a stage means a step in the subband-division in the Wavelet transformation. Performing one step of subband-division generates the stage 0. Performing one further step of subband-division toward a LL component of the stage 0 generates a stage 1. Performing an even further step of subband-division generates a stage 2.

Figure 6A:
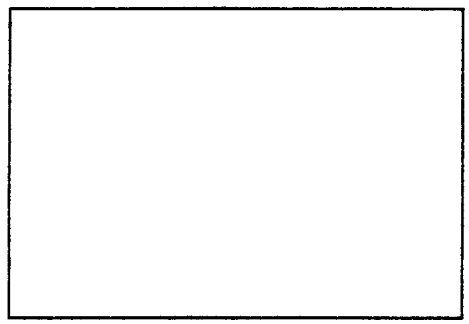
FIGS. 6A to 6D are explanatory diagrams for explaining subbands in the embodiment 1 of the present invention.
Figure 6B:
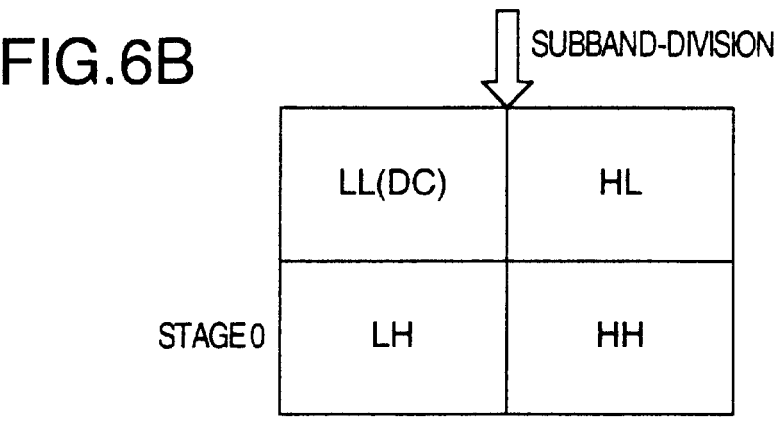
Figure 6C:
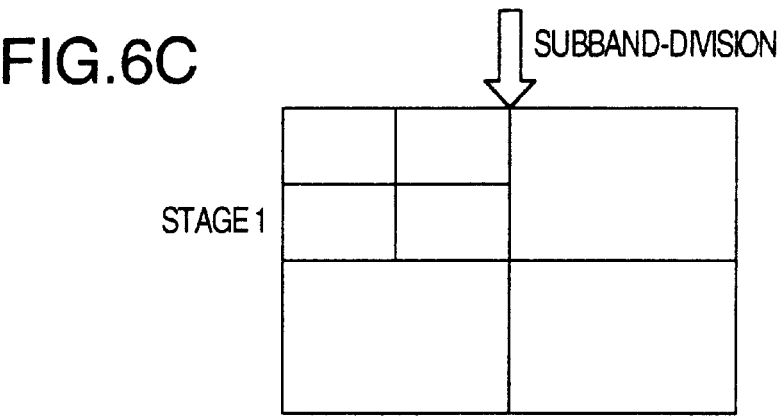

Also, as illustrated in FIG. 6B, let the following regions be referred to as follows: A region to which the LPF is applied in the horizontal direction and the HPF is applied in the vertical direction is called LH frequency component space (LH), a region to which the LPF is applied in the horizontal direction and the LPF is applied in the vertical direction is called LL frequency component space (LL), a region to which the HPF is applied in the horizontal direction and the LPF is applied in the vertical direction is called HL frequency component space (HL), and, a region to which the HPF is applied in the horizontal direction and the HPF is applied in the vertical direction is called HH frequency component space (HH).

Here, referring to FIG. 3, the explanation will be given below regarding the subband-divided frequency components in the stage 0. The amount of the inputted image data is thinned out down to the one-half by the image data's being passed through a horizontal-direction LPF 2101, and is further thinned out down to the one-half by the image data's being passed through a next vertical-direction HPF 2103, thereby obtaining a LH subband signal (S 0. LH) in the stage 0. Also, the amount of the inputted image data is thinned out down to the one-half by the image data's being passed through a horizontal-direction HPF 2102, and is further thinned out down to the one-half by the image data's being passed through a next vertical-direction LPF 2104, thereby obtaining a HL subband signal (S 0. HL) in the stage 0. Also, the amount of the inputted image data is thinned out down to the one-half by the image data's being passed through the horizontal-direction HPF 2102, and is further thinned out down to the one-half by the image data's being passed through a next vertical-direction HPF 2105, thereby obtaining a HH subband signal (S 0. HH) in the stage 0.

FIG. 3 indicates the state where the above-described 3 Wavelet transformations have been performed. Toward the component the data amount of which has been thinned out down to the one-half by being passed through the first step's horizontal-direction LPF 2101 and further thinned out down to the one-half by being passed through a next vertical-direction LPF 2106, the above-described processing is repeated further, thereby obtaining the stage 1 and the stage 2. (S 1. LH), (S 1. HL), (S 1. HH) are subband signals in the stage 1, and (S 2. LH), (S 2. HL), (S 2. HH) are subband signals in the stage 2.

It is possible to repeat the above-described processing even further. Toward the component obtained by applying the above-mentioned horizontal-direction and vertical-direction LPFs to a LL frequency component space (LL) in the subband-division in a S n stage, the above-described processing is performed. By doing this, it turns out that component data of the frequency component space, the data amount of which has been reduced down to the one-fourth, will be accumulated in a LL frequency component space (LL) in the subband-division in a S n+1 stage to which the LPF is applied in the horizontal direction and the LPF is applied in the vertical direction. Additionally, here, the component data are values of the coefficient components by the Wavelet transformation in the respective X–Y coordinate positions.

Figure 6D:
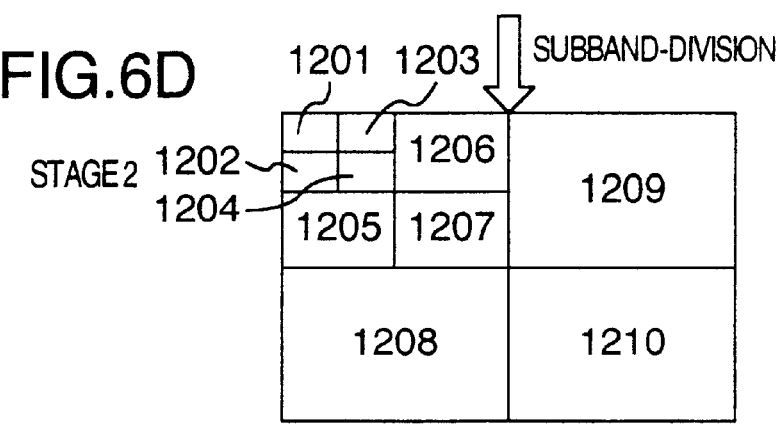

FIG. 6D indicates frequency component spaces of the entire frequency bands that include the component data remaining after the subband-division in the stage 2 has been performed. The reference numerals denote the following, respectively: 1201 LL component frequency component space (DC frequency component space) in the stage 2, 1202 LH component frequency component space in the stage 2, 1203 HL component frequency component space in the stage 2, 1204 HH component frequency component space in the stage 2, 1205, 1206, 1207 LH, HL, HH frequency component spaces of the respective components in the stage 1, 1208, 1209, 1210 LH, HL, HH frequency component spaces of the respective components in the stage 0.

Next, the explanation will be given below concerning the following case: In the image analyzing processing at the step 203 in FIG. 2, taking and calculating the sum-total of the component data in the respective X–Y coordinates included in the horizontal (LH), vertical (HL), and oblique (HH) component spaces in a certain stage after the transformations explained in FIGS. 6A to 6D, features of an image are extracted based on the value of the sum-total calculated.

Figure 7A:
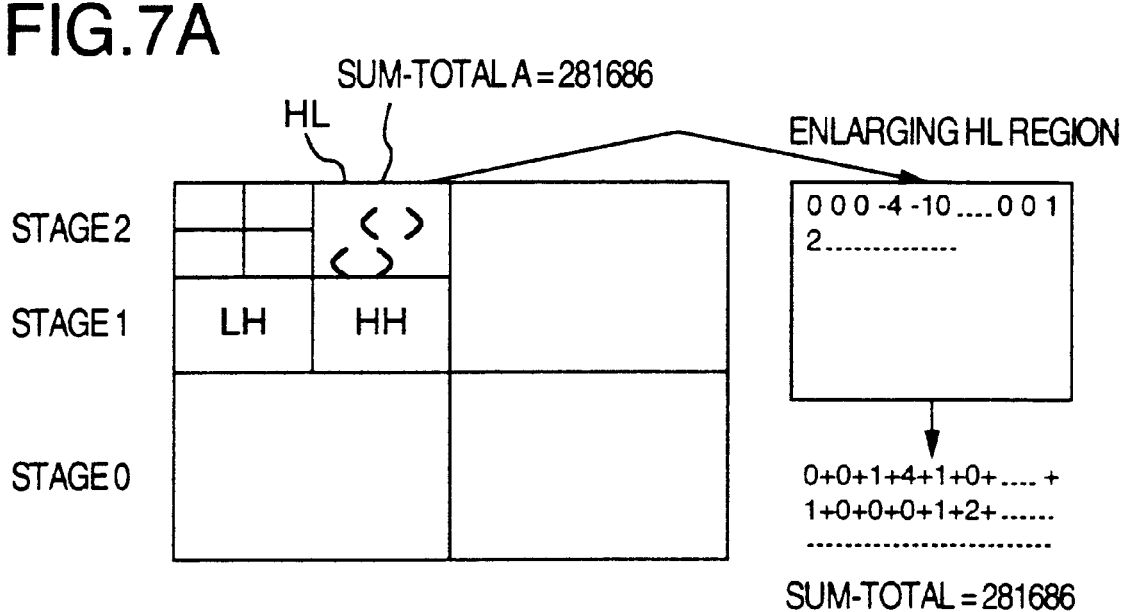
FIGS. 7A to 7C are explanatory diagrams for explaining examples of sum-total of frequency regions in the embodiment 1 of the present invention.
Figure 7B:
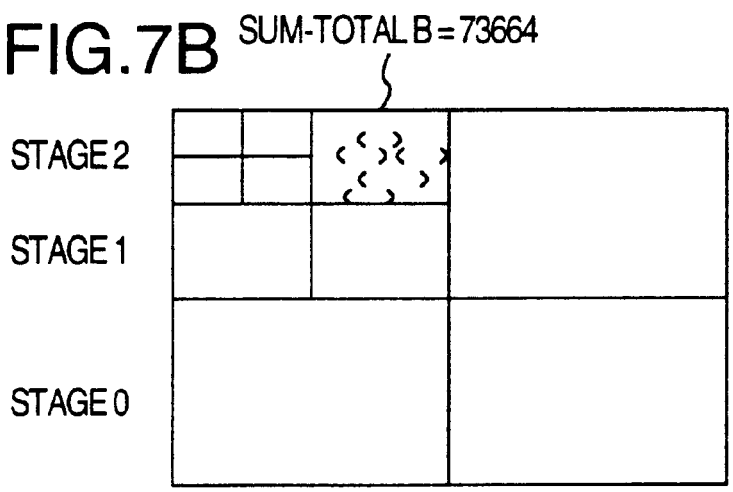
Figure 7C:
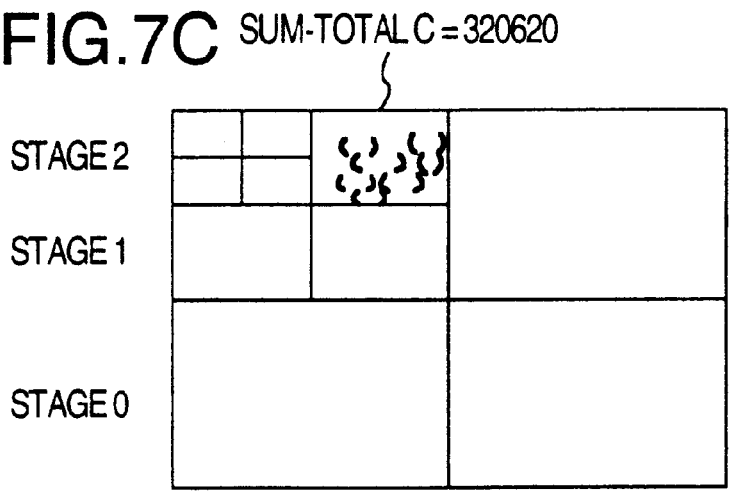

Concretely speaking, when measuring the degree of activity of a microbe or a cell in a medical agent, the sum-total of the component data of the transformation coefficients in the vertical (HL) component space of an early-stage image illustrated in FIG. 7A is equal to A=281686. In the case where the microbe or the cell has been activated, the sum-total of the component data in the same vertical (HL) component space of the same image, which is illustrated in FIG. 7B, is equal to B=73664. In the case where the microbe or the cell has not been activated, the sum-total of the component data in the same vertical (HL) component space of the same image, which is illustrated in FIG. 7C, is equal to C=320620.

When the microbe or the cell is activated and exhibits the division, the microbe or the cell is divided into infinitesimal organizations and the high frequency components of the image are increased. As a result, the absolute values of the component data of the transformation coefficients in the vertical (HL) component space in the stage 1 become smaller, and accordingly the sum-total B becomes smaller than the sum-total A. In contrast to this, the microbe or the cell that has not been activated exhibits no division. On the contrary, it dies due to the reaction with the medical agent and is coagulated, becoming a round configuration. As a result, the vertical components are increased, and accordingly the sum-total C of the data of the transformation coefficients becomes somewhat larger than the early-stage sum-total A.

As explained above, comparing the sum-totals of the time-dependent component data makes it possible to quantify the degree of activity. Incidentally, the frequency component spaces need not be limited to one frequency component space. Namely, for the use in the estimation, it is possible to select a plurality of frequency component spaces where the features can be extracted.

Next, the explanation will be given below concerning an example of the case where the frequency conversion is performed after the images are rotated.

Figure 2:
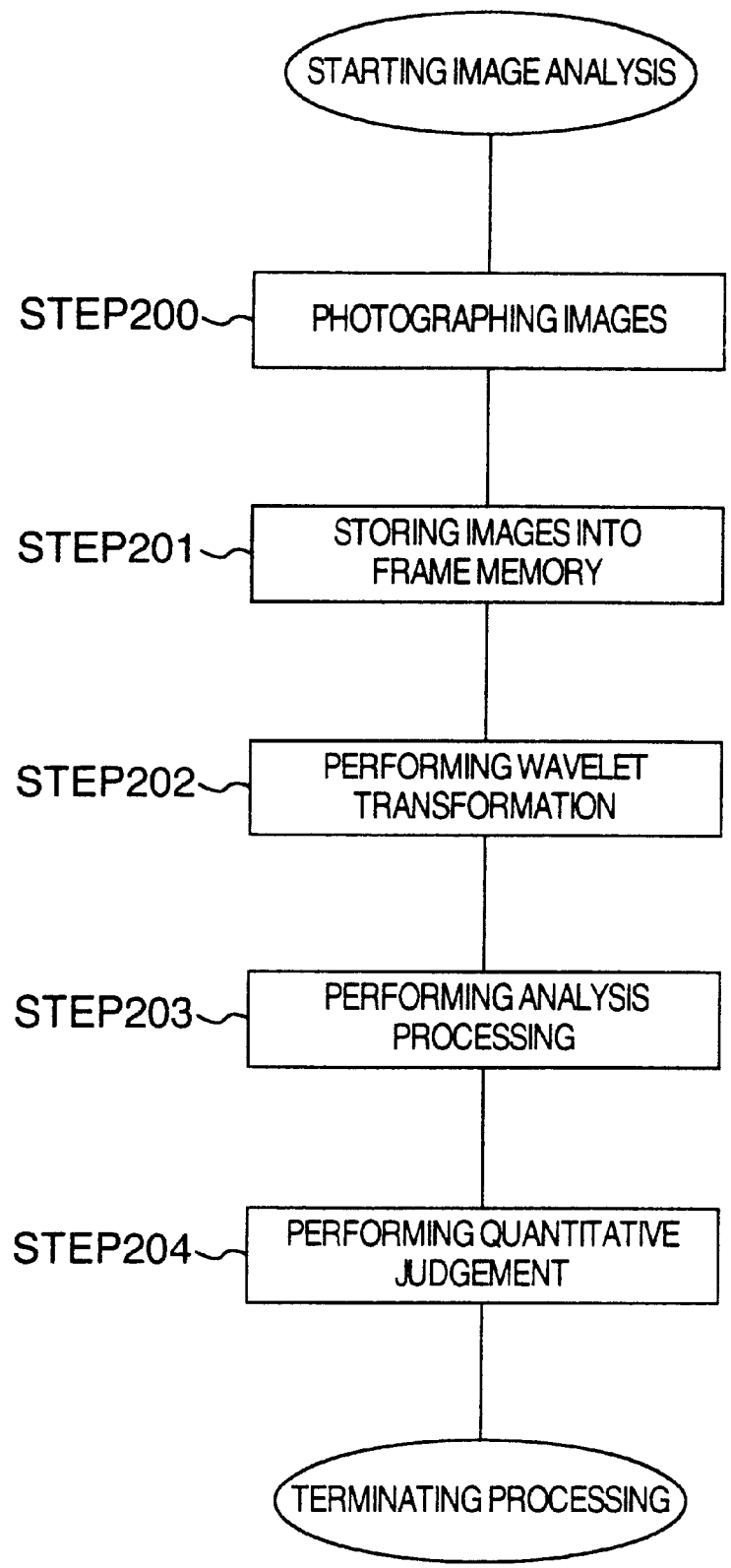
FIG. 2 is a flowchart for illustrating an image analyzing method in the image analyzing apparatus according to the embodiment 1 of the present invention.

First, before storing the fetched images into the frame memory at the step 201 illustrated in FIG. 2, the fetched images are rotated using a transformation such as an affine transformation, thereby causing the samples to be aligned horizontally.

For example, it is unrecognizable in what direction the tissues of the sample images of the microbes and the cells are aligned. Thus, by calculating the sum-total of the component data in the horizontal direction every time the images are rotated by 30 degrees through the application of the affine transformation, the rotation is performed so that the value of the sum-total becomes its maximum.

Next, in the image analyzing processing at the step 203, by each taking the sum-total of the respective component data in the horizontal and vertical regions in a certain stage after the transformations in FIGS. 6A to 6D, it becomes possible to quantify the configuration with the flattening ratio by using the ratio between the respective sum-totals in the horizontal and vertical regions. Namely, it is possible to perform quantitative judgement on in what rate the configuration is changing.

Apart from the above-described method of rotating the images so that the samples are aligned in the horizontal direction, the method of determining the flattening ratio is as follows: In the image analyzing processing at the step 203, it can be judged that the samples are aligned in the direction in which the sum-total of the component data in the horizontal, vertical, and oblique regions is the largest. Thus, it is also possible to determine the flattening ratio by assuming the region to be horizontal.

Next, the explanation will be given below regarding the following case: Using one or more of regions after the frequency conversion, a threshold value as the absolute value is provided toward the data after the conversion. Then, the data smaller than the threshold value is set to be 0 and only the component larger than the threshold value is detected as an effective component, thereby performing quantitative judgement on the position and the number of the objects to be observed such as the cells.

In the image analyzing processing at the step 204 illustrated in FIG. 2, using one or more of regions in the respective regions after the conversion in a certain stage after the transformations in FIGS. 6A to 6D, a threshold value as the absolute value is provided toward the data after the conversion. Then, the data smaller than the threshold value is set to be 0 and only the component larger than the threshold value is detected as an effective component, thereby making it possible to execute automatic quantitative judgement on factors, such as the position and the number of the cells and the rate toward the entire area, and the classification according to the magnitude of the coefficients.

Next, the explanation will be given below regarding an example of the following case: Using one or more of regions in the respective regions after the frequency conversion and taking advantage of a characteristic that a sample cell is activated, exhibits the division and spreads, these regions are divided into blocks so as to count the number of the components that are judged to be effective components by a threshold value existing within one block, thereby executing quantitative judgement on the degree of activity of the cells in terms of the number and the area ratio.

In the image analyzing processing at the step 204 illustrated in FIG. 2, using one or more of regions in the respective regions after the conversion in a certain stage after the transformations in FIGS. 6A to 6D and taking advantage of a characteristic that a sample cell is activated, exhibits the division and spreads, the detection of effective components by a threshold value is performed first. For example, letting the threshold value be equal to 10, if the absolute value of a data component is 10 or larger, the data component is left as it is as an effective component, and if the absolute value of a data component is 9 or smaller, the data component is set to be 0. Then, the data other than 0 are detected as the effective components.

Figure 8:
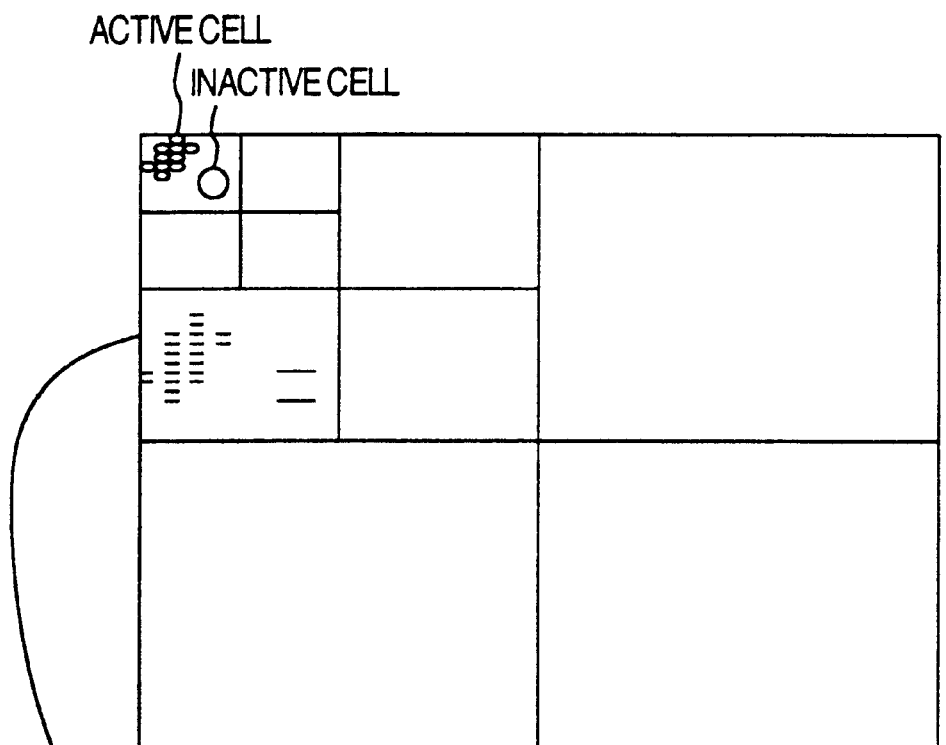
FIG. 8 is an explanatory diagram for explaining an example of activity/inactivity of cells in the embodiment 1 of the present invention.
Figure 8:
Figure 8:
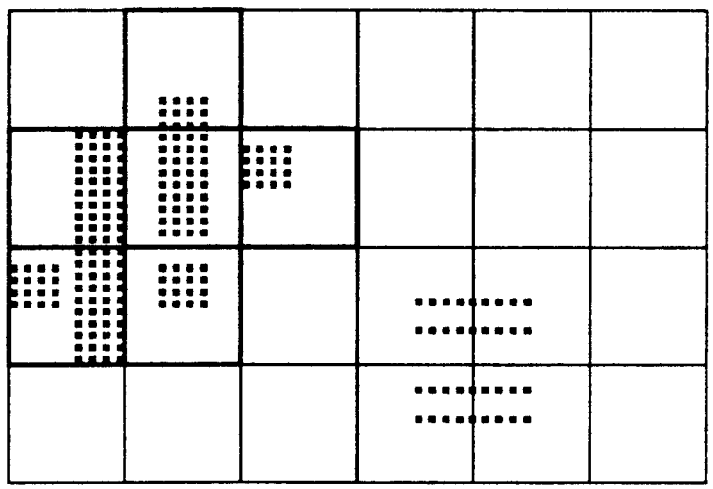
Figure 8:

Next, as illustrated in FIG. 8, the converted region is divided into 4×4 or 8×8 blocks that are larger than the area of the cells.

Next, the number of the effective components existing within one block is counted, thereby executing the quantification by the number within one block and executing quantitative judgement on the activation of the cells by the area ratio of a block, within which the number of the effective components is larger than the threshold value, to the whole blocks.

Figure 9:
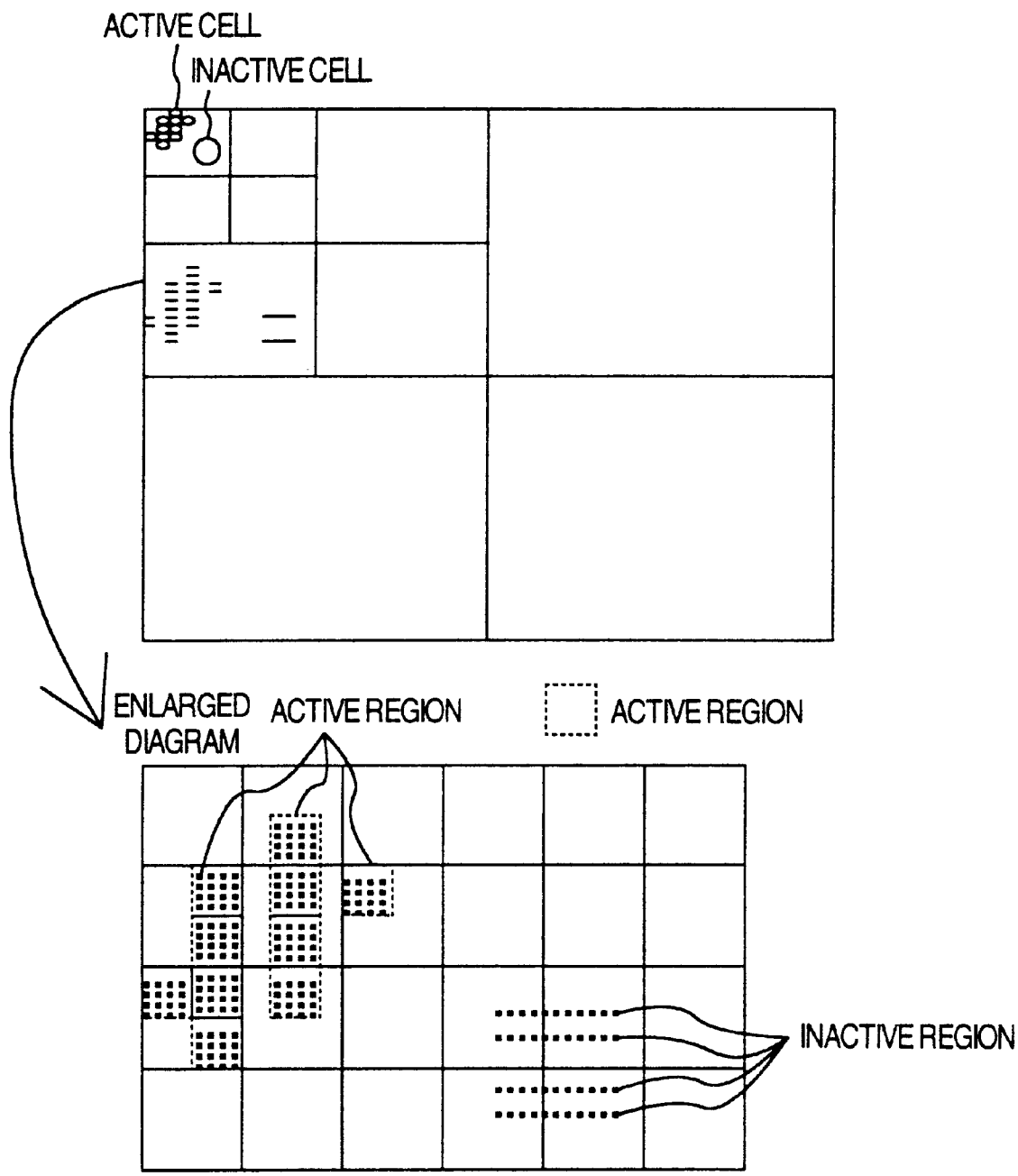
FIG. 9 is an explanatory diagram for explaining an example of activity/inactivity of cells in the embodiment 1 of the present invention.

Next, using FIG. 9, the explanation will be given below concerning an example of the following case: Using one or more of regions in the regions after the frequency conversion and taking advantage of a characteristic that a sample cell is activated, exhibits the division and spreads, a region, in which effective components having a value larger than a threshold value are detected in a state of being extended beyond a fixed value of area, is judged to be an active region, thus executing quantitative judgement on about what extent of the whole regions are the active regions.

In the image analyzing processing at the step 204 illustrated in FIG. 2, using one or more of regions in the respective regions after the conversion in a certain stage after the transformations in FIGS. 6A to 6D and taking advantage of a characteristic that a sample cell is activated, exhibits the division and spreads, the detection of effective components by a threshold value is performed first, thus checking whether or not, with an effective component larger than the threshold value as a center, there exist the effective components larger than the threshold value in the peripheral 2-dimensional coordinate region. For example, in the case where the effective components appear in a state of being connected to each other just like the active regions illustrated in FIG. 9, the effective components can be regarded as being detected in the state of being extended beyond the fixed value of area, and thus these regions are judged to be the active regions. Conversely, in the case where the effective components are isolated from each other just like inactive regions illustrated in FIG. 9, the cells can be regarded as not being activated, and thus these regions are judged to be the inactive regions. This makes it possible to execute automatic judgement on the active regions, and also makes it possible to execute the quantitative judgement on about what extent of the entire sample images are the active regions.

Also, until now, the subband-divided frequency components after the Wavelet transformation have been used for the analysis of the sample images of the microbes or the cells. The other ways of the use are as follows: Quantitative measurement on the reaction extent with a medical agent through analysis of the color and the light and shade by the magnitude of the transformation coefficients, and quantitative measurement on the magnitude and the number of the observation objects with the use of the coordinate information on the transformation coefficients. Moreover, by judging in which direction of the horizontal (LH), vertical (HL), and oblique (LL) directions the large transformation coefficient exists in the same coordinate, it is possible to judge the direction. This allows the degree of the mycelium's growth to be quantified from the connected length.

Embodiment 2

Figure 10:
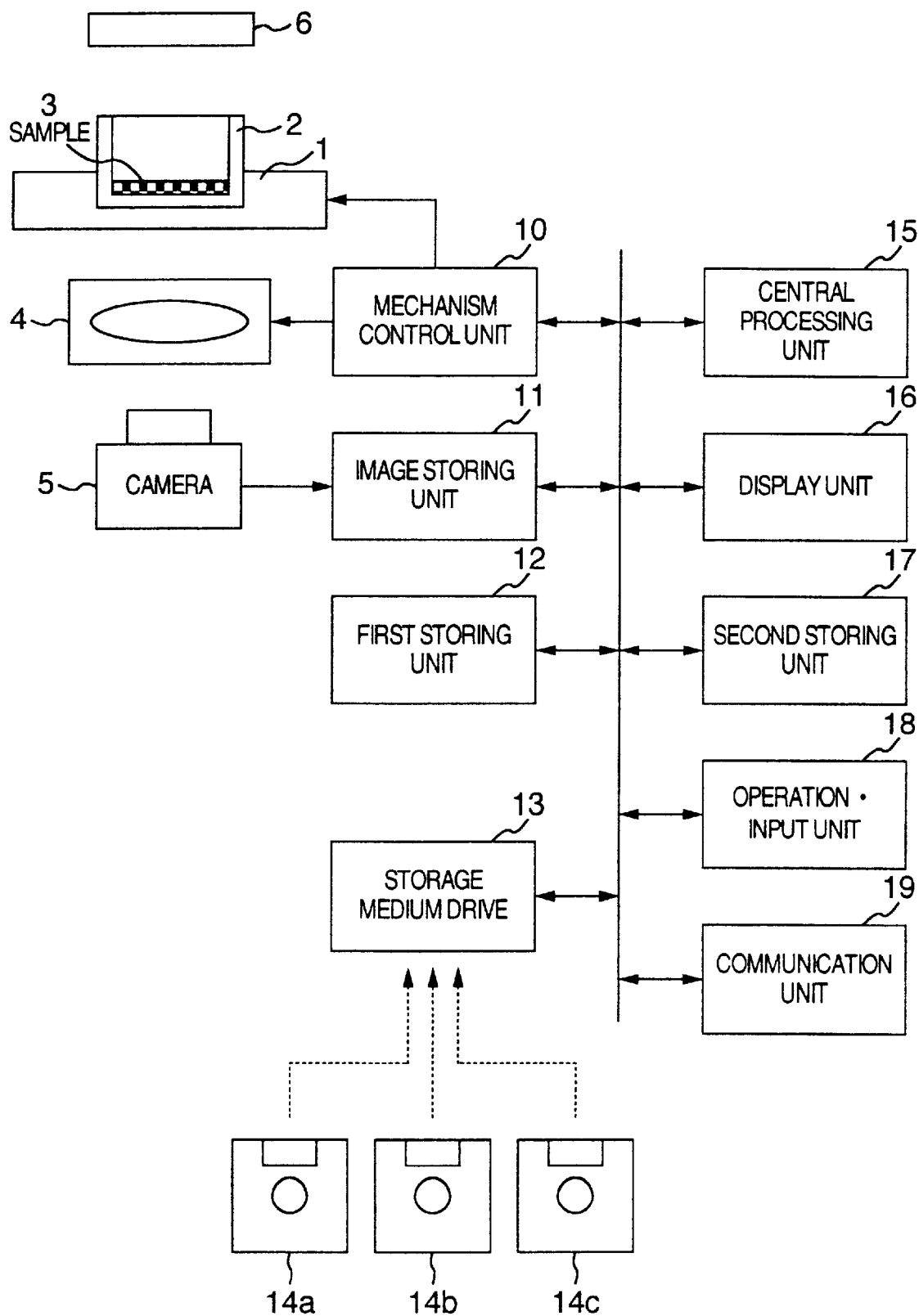
FIG. 10 is a block diagram for illustrating the configuration of an image analyzing apparatus according to an embodiment 2 of the present invention.
Figure 11:
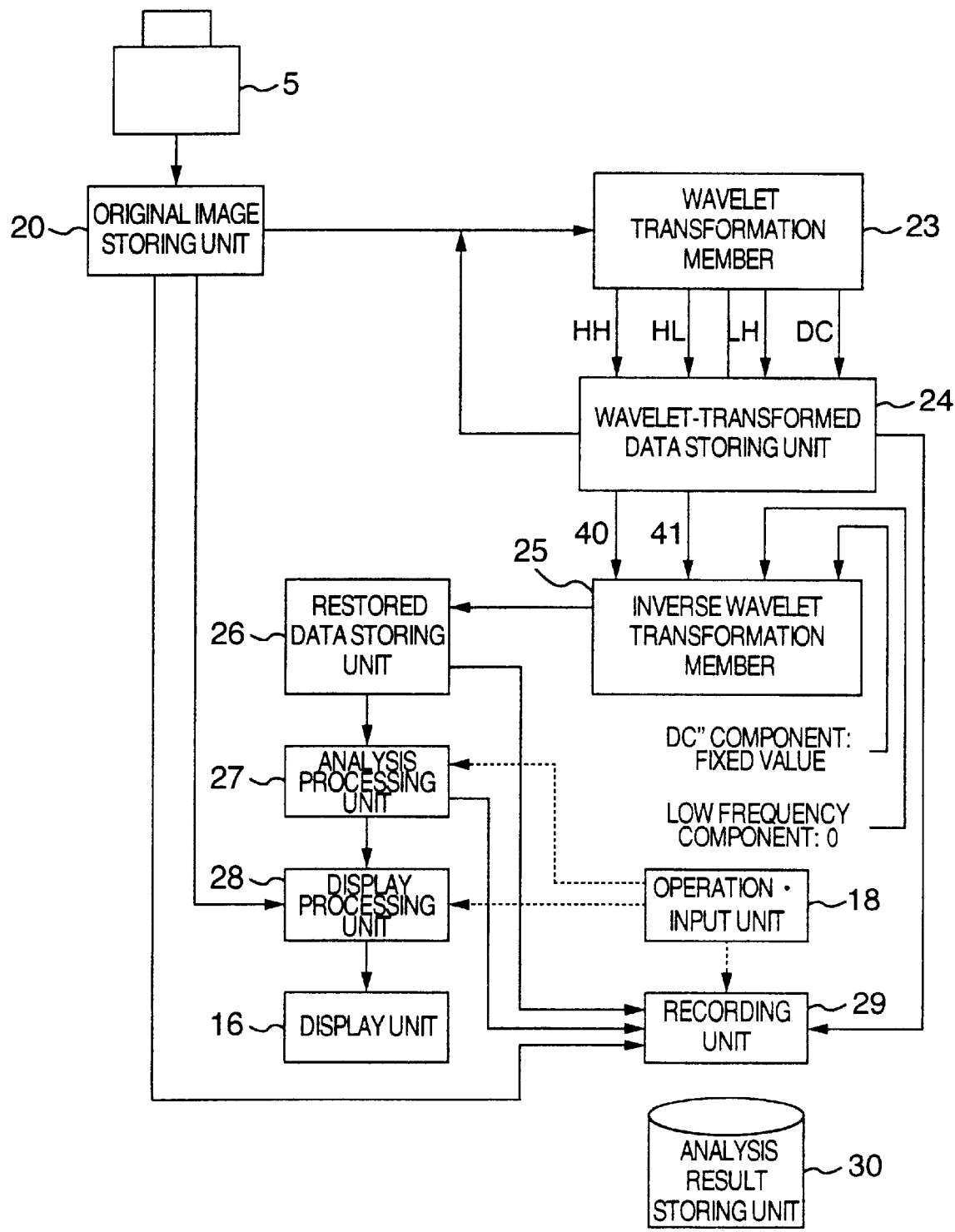
FIG. 11 is a function block diagram for illustrating the processing functions of the image analyzing apparatus according to the embodiment 2 of the present invention.
Figure 12A:
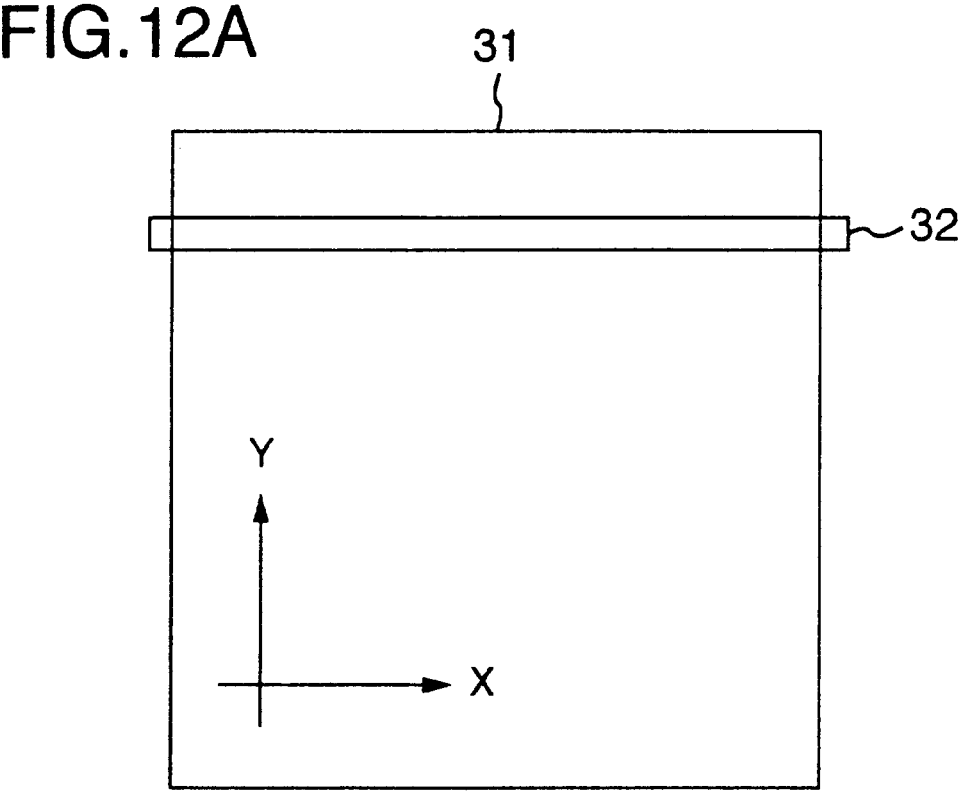
FIG. 12A is a diagram for illustrating microscopic images by the image analyzing apparatus according to the embodiment 1 of the present invention.
Figure 12B:
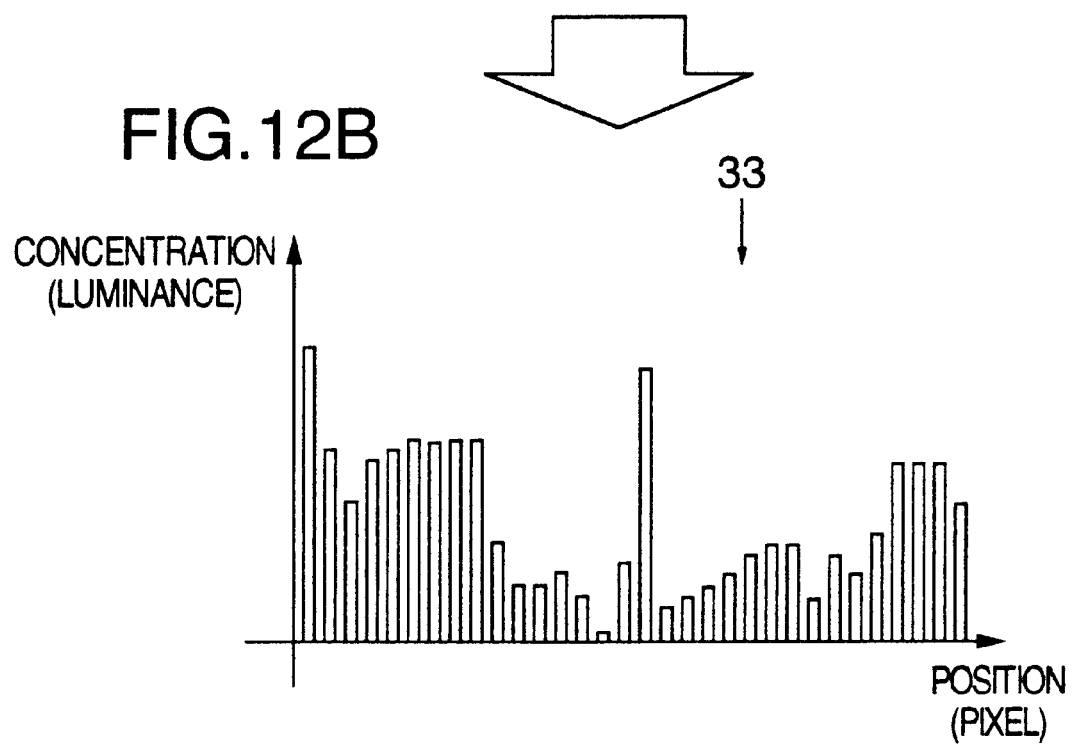
FIG. 12B is a graph for illustrating signal components of image data by the image analyzing apparatus according to the embodiment 1 of the present invention.
Figure 13:
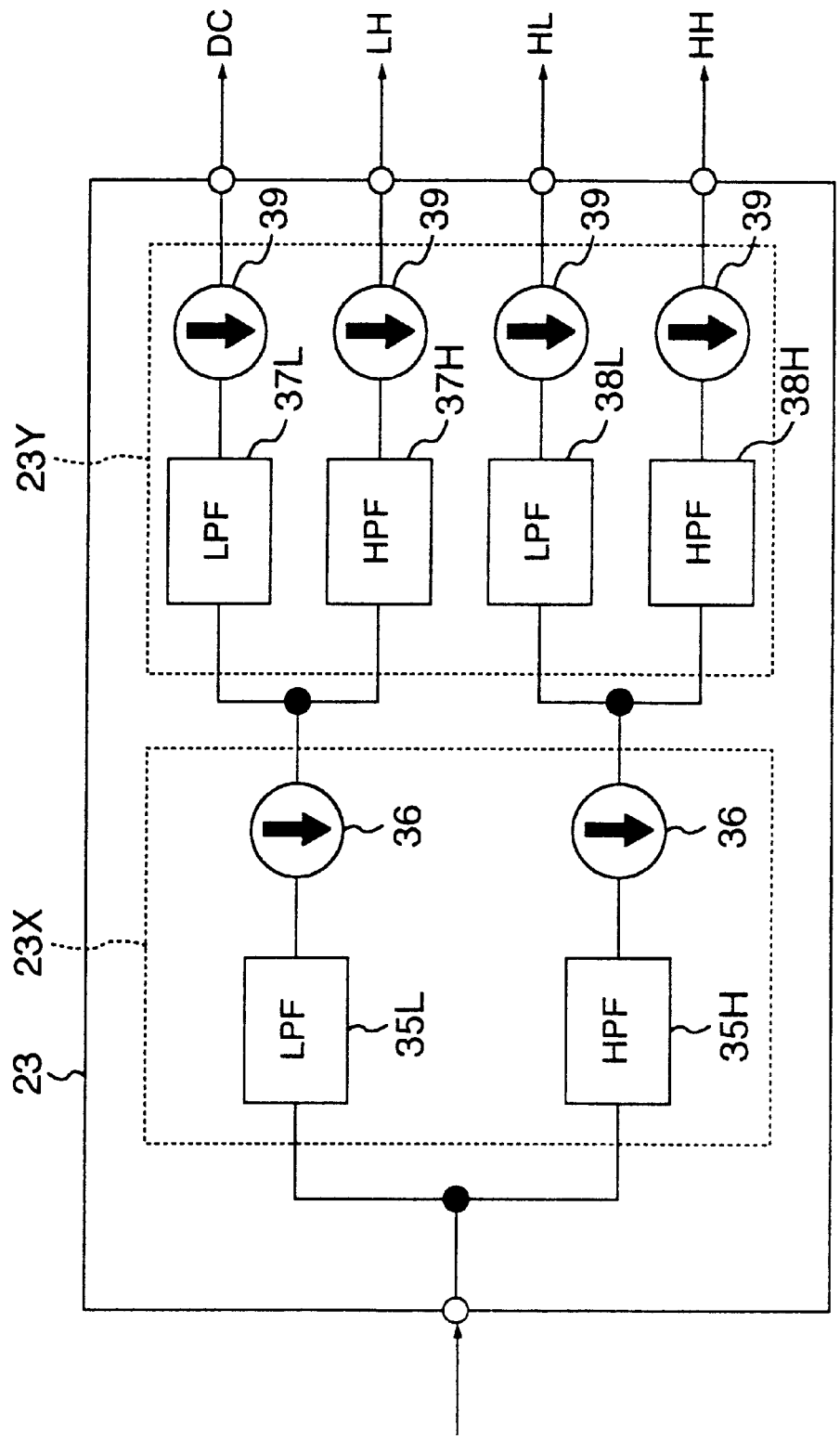
FIG. 13 is a block diagram for illustrating the configuration of a Wavelet transformation processing unit of the image analyzing apparatus according to the embodiment 2 of the present invention.
Figure 15:
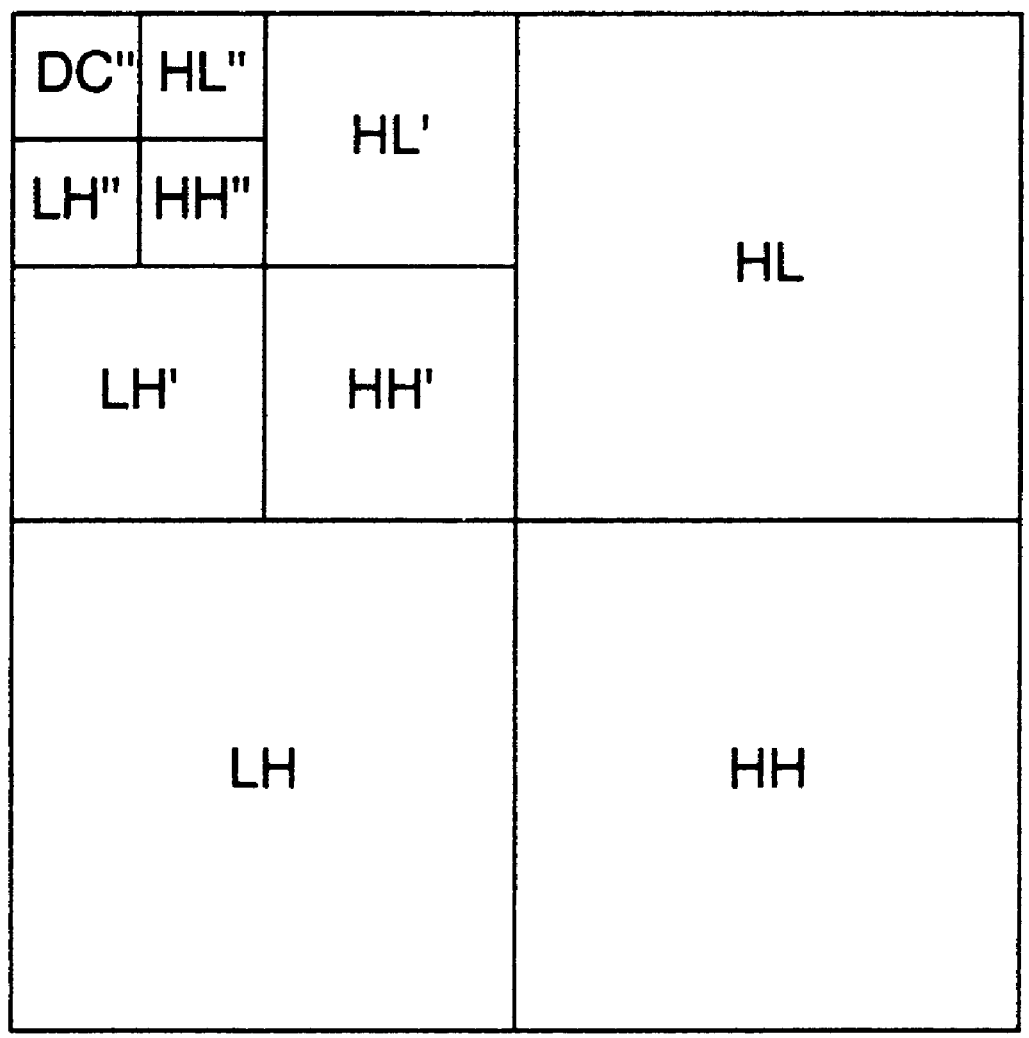
FIG. 15 is an explanatory diagram for explaining a Wavelet transformation processing of the image analyzing apparatus according to the embodiment 2 of the present invention.
Figure 16:
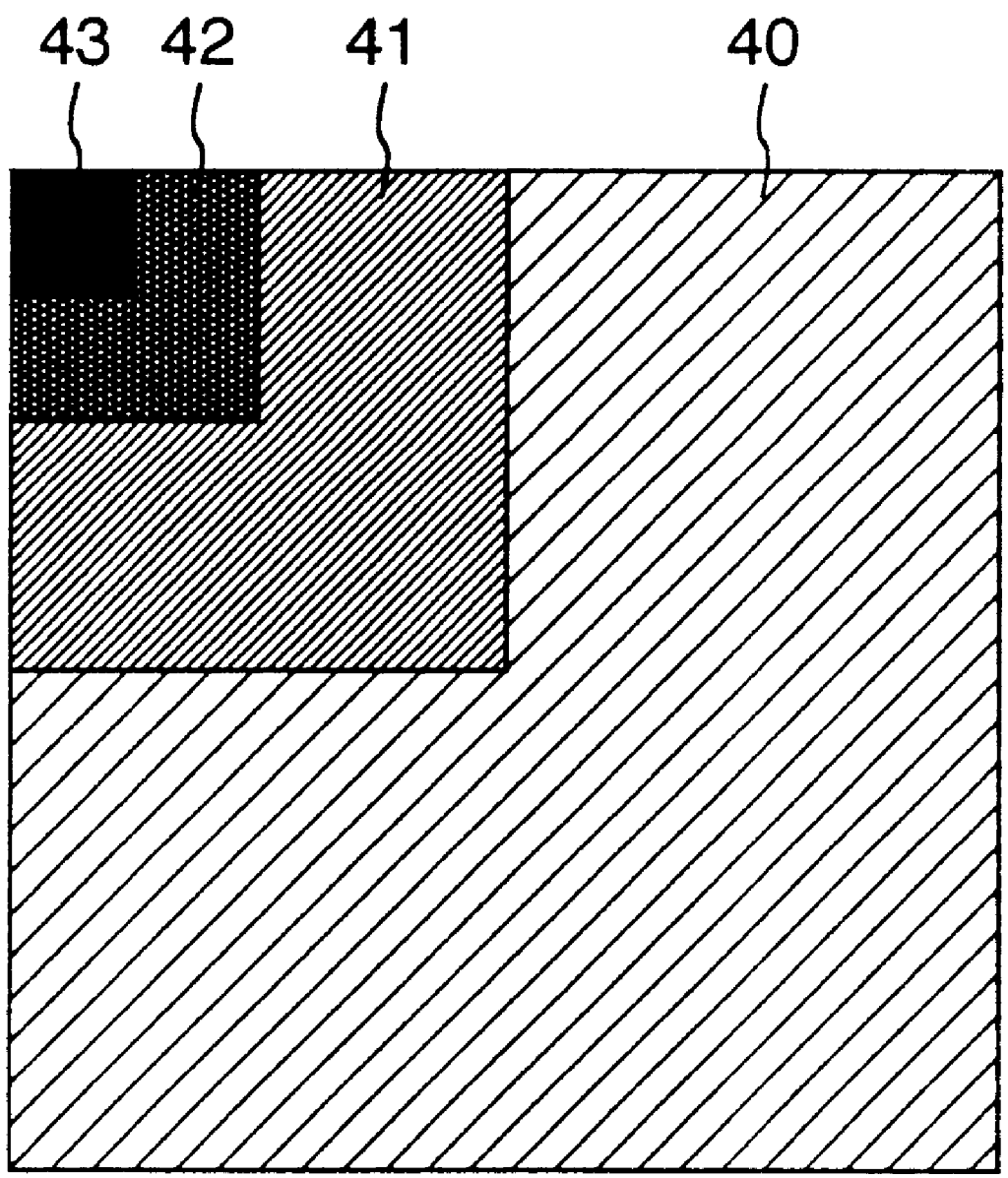
FIG. 16 is an explanatory diagram for explaining a Wavelet transformation processing of the image analyzing apparatus according to the embodiment 2 of the present invention.
Figure 17:
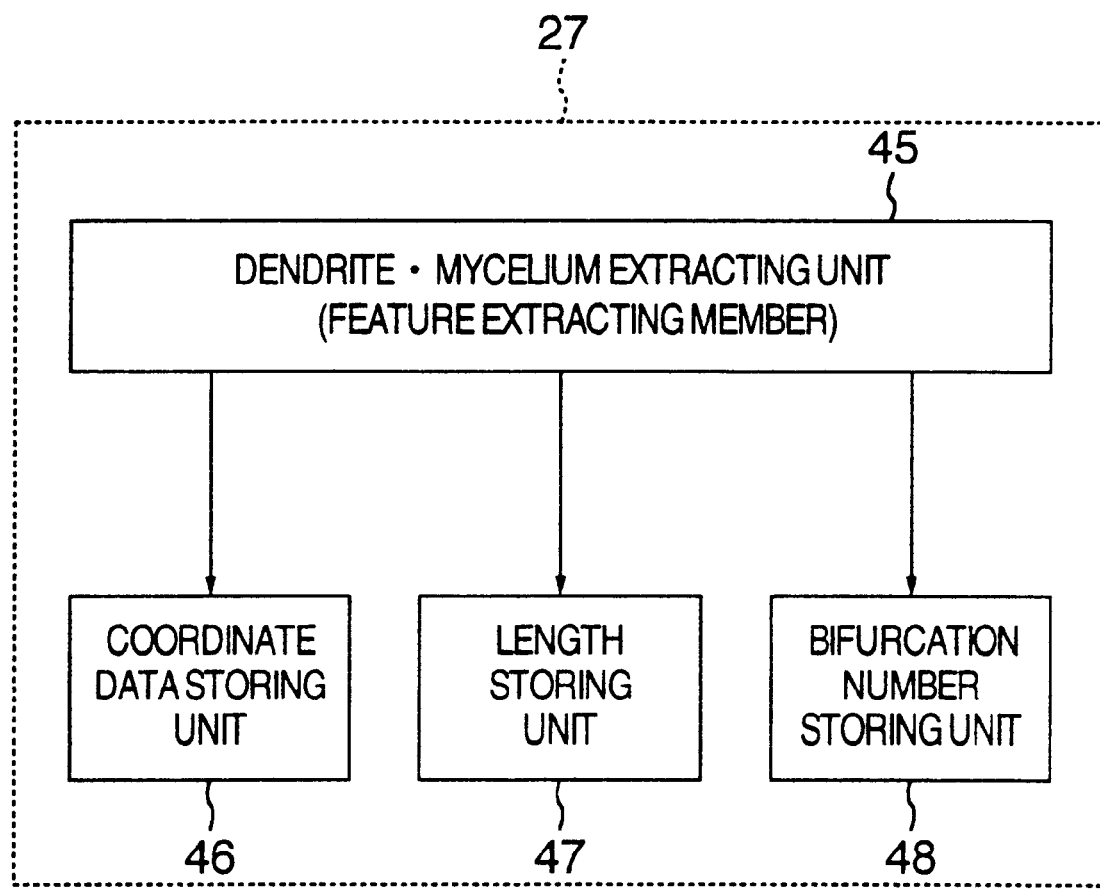
FIG. 17 is a block diagram for illustrating the function of an analysis processing unit of the image analyzing apparatus according to the embodiment 2 of the present invention.
Figure 18:
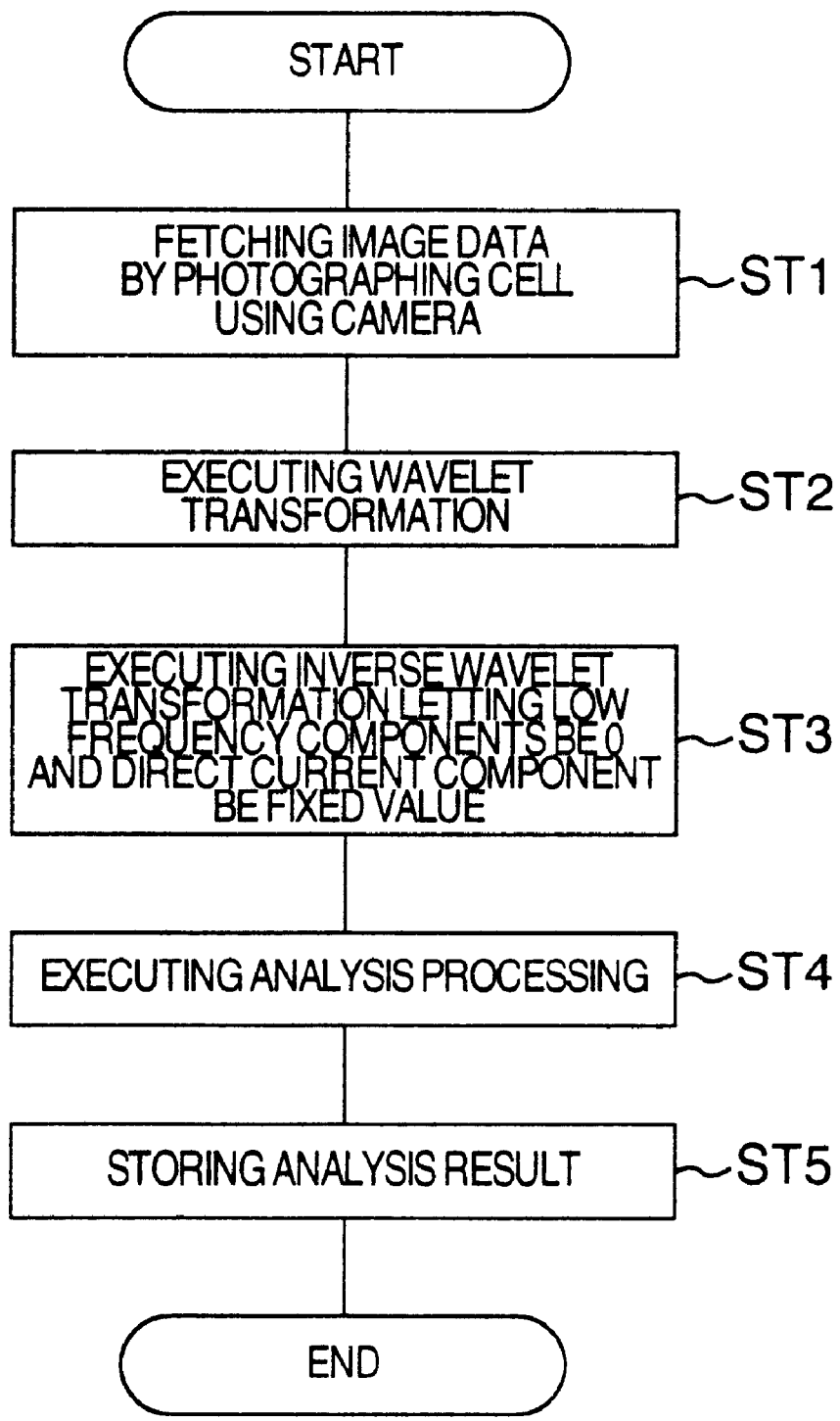
FIG. 18 is a flow diagram for illustrating an image analyzing method in the embodiment 2 of the present invention.

FIG. 10 is a block diagram for illustrating the configuration of an image analyzing apparatus according to an embodiment 2 of the present invention, FIG. 11 is a function block diagram for illustrating the processing functions of the image analyzing apparatus according to the embodiment 2 of the present invention, FIG. 12A is a diagram for illustrating microscopic images by the image analyzing apparatus according to the embodiment 2 of the present invention, FIG. 12B is a graph for illustrating signal components of image data by the image analyzing apparatus according to the embodiment 2 of the present invention, FIG. 13 is a block diagram for illustrating the configuration of a Wavelet transformation processing unit of the image analyzing apparatus according to the embodiment 2 of the present invention, FIGS. 14A to 14C, FIG. 15, and FIG. 16 are explanatory diagrams for explaining a Wavelet transformation processing of the image analyzing apparatus according to the embodiment 2 of the present invention, FIG. 17 is a block diagram for illustrating the function of an analysis processing unit of the image analyzing apparatus according to the embodiment 2 of the present invention, FIG. 18 is a flow diagram for illustrating an image analyzing method in the embodiment 2 of the present invention, and, FIGS. 19A to 19C, FIGS. 20A to 20C, and FIGS. 21A to 21C are diagrams for illustrating cell images by the image analyzing apparatus according to the embodiment 2 of the present invention.

First, referring to FIG. 10, the explanation will be given below concerning the configuration of the image analyzing apparatus. In FIG. 10, a container 2, which is a carrier containing observation objects such as cells, is mounted on a positioning stage 1. The container 2 is a transparent object visually recognizable from the outside, and contains therein a sample 3 including observation objects such as the cells of animals and plants. A microscope 4 having a focusing mechanism is provided under the positioning stage 1. A camera 5 is located under the microscope 4.

In a state where an illuminating apparatus 6 provided over the positioning stage 1 is lit up to illuminate the container 2, the camera 5 photographs the cells of animals and plants inside the sample 3 through the microscope 4, thereby obtaining digital image data of the cell images. The positioning stage 1 and the microscope 4 are connected to a mechanism control unit 10. The mechanism control unit 10 controls the positioning stage 1, thereby allowing the camera 5 to photograph a desired position inside the container 2. Also, the focusing mechanism of the microscope 4 is controlled, thereby making it possible to adjust the focus onto a desired position.

The camera 5 is connected to an image storing unit 11, and the digital image data obtained by the camera 5 is stored into the image storing unit 11. A first storing unit 12, which is a program storing unit, stores programs of executing various types of calculation and operation control processings described later, such as a program of executing the Wavelet transformation processing and a program of executing an analysis processing based on converted data. A central processing unit 15, i.e., a CPU, executes various types of calculations and operation controls in accordance with the programs stored in the first storing unit 12. A display unit 16, which is a monitoring apparatus, displays the images obtained by the camera 5 and images toward which the analysis processing has been performed, and in addition displays a guiding prompt screen at the time of the operation input.

A second storing unit 17, which is a data storing unit, stores various types of data such as an analysis result, various types of processed data, and setting data. An operation-input unit 18, which is an inputting member such as a keyboard or a mouse, performs inputting of an operation command and inputting of data. A communication unit 19 performs transmission/reception of data with an external device through a wired or wireless communication network. A storage medium drive 13 is a drive device that performs readings of data from portable storage mediums such as a magnetic disk like a floppy disk and a memory card.

Here, from the following three types of storage mediums as needed through the storage medium drive 13, readings of data of mutually different types are executed. A first storage medium 14a stores the image data of the original images at the step prior to the execution of the analysis processing, thus being able to take out the images obtained by the present image analyzing apparatus or to perform an analysis in which an image obtained by the other analyzing apparatus is selected as the object.

A second storage medium 14b stores the programs of executing various types of calculation and operation control processings such as the program of executing the Wavelet transformation processing and the program of executing an analysis processing based on converted data. These programs are installed into a general personal computer including mechanisms of an operating unit, a storing unit, an operation-input unit and a display unit, thereby being able to cause the personal computer to function as an image analyzing apparatus. Namely, the image data read from the first storage medium 14a are calculated and processed in the personal computer in accordance with the programs read from the second storage medium 14b, thereby being able to perform the analysis processing of the cell images.

A third storage medium 14c stores data on the analysis results. The already analyzed data created already by the present image analyzing apparatus is written into the third storage medium so as to be taken out, or the data on the analysis results performed by the external analyzing apparatus are read from the third storage medium into which the data on the analysis results are written, thus being able to cause the monitoring apparatus of the display unit 16 to display these analysis results.

Next, referring to FIG. 11, the explanation will be given below regarding the processing functions of the image analyzing apparatus of the cell images. A Wavelet transformation member 23, an inverse Wavelet transformation member 25, an analysis processing unit 27, a display processing unit 28, and a recording unit 29 illustrated in FIG. 11 denotes the processing functions executed in FIG. 10 by the central processing unit 15 in accordance with the programs stored in the first storing unit 12. Also, a Wavelet-transformed data storing unit 24, a restored data storing unit 26, and an analysis result storing unit 30 denotes the storing regions set in the second storing unit 17 illustrated in FIG. 10.

In FIG. 11, an original image storing unit 20 stores the image data obtained by the camera 5 and the image data read from the first storage medium 14a. The image data of the analysis objects are Wavelet-transformed first by the Wavelet transformation member 23. The Wavelet transformation is a method of analyzing a signal such as a voice or an image with the use of the frequency conversion. The Wavelet transformation has a characteristic that, in a processing step of extracting a specified waveform out of a variety of waveforms included in the original signal of the analysis object, the position information on the extraction object waveform is conserved without being deteriorated. Applying the Wavelet transformation to the image analysis makes it possible to execute a high-accuracy analysis processing in such a manner that, when a feature portion in the image is extracted, influences of the position error and the noise are excluded.

Next, referring to each of FIGS. 12A to 16, the explanation will be given below concerning the Wavelet transformation with the cell images selected as the objects. First, referring to FIGS. 12A to 12B, the explanation will be given regarding the Wavelet transformation performed by the Wavelet transformation member 23. In FIG. 12A, an image 31 obtained by the camera 5 is configured by a large number of pixels arranged in X and Y directions. The image information is represented by pixel values indicating the light and shade (luminance) of the respective pixels. In FIG. 12B, one pixel line 32 of the image 31 in a horizontal direction (X direction) is taken out and distribution of the concentration for each pixel is represented by a bar graph 33. As illustrated in FIG. 13, the Wavelet transformation member 23 includes a horizontal Wavelet transformation unit 23X and a vertical Wavelet transformation unit 23Y. The horizontal Wavelet transformation unit 23X is provided with a low pass filter (Hereinafter, abbreviated as "LPF".) 35L and a high pass filter (Hereinafter, abbreviated as "HPF".) 35H. A image signal inputted into the horizontal Wavelet transformation unit 23X is subband-divided by the LPF 35L and the HPF 35H. The LPF 35L and the HPF 35H are configured by functions. The functions in the case of the present embodiment are given below:

Low Pass Filter $$F_0(Z) = \frac{1 + Z^{-1}}{\sqrt{2}}$$

High Pass Filter $$F_1(Z) = \frac{1 - Z^{-1}}{\sqrt{2}}$$

Z: Pixel Value

The functions are Haar Wavelet functions, which are known as functions employed in the Wavelet transformation. The pixel values are inputted into the functions in the order where the pixels are arranged in the horizontal direction. This operation causes the low frequency component to be outputted from the LPF 35L and the high frequency component to be outputted from the HPF 35H.

Figure 14A:
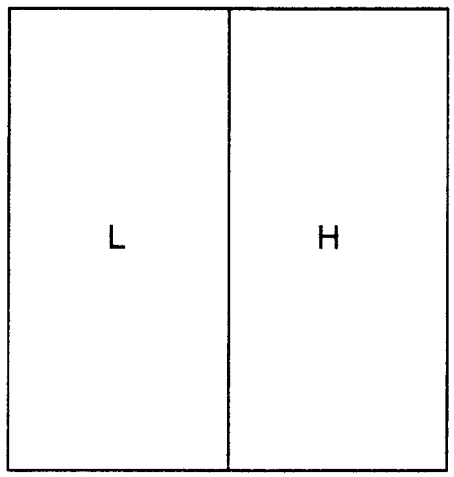
FIGS. 14A to 14C are explanatory diagrams for explaining a Wavelet transformation processing of the image analyzing apparatus according to the embodiment 2 of the present invention.

Next, toward the image signal subband-divided in this way, down samplers 36 perform the processing of thinning out the data, i.e., the processing of thinning out, one after the other, the data arranged in the horizontal direction, thereby reducing the data amount of the image signal down to the one-half. FIG. 14A illustrates, schematically for each band, the frequency components of the image signal that has been subband-divided and then has been compressed down to the one-half in the horizontal direction by the down sampling processing.

As illustrated in FIG. 14A, the horizontal Wavelet transformation processing divides the image signal into regions where the left half includes only the low frequency band component (abbreviated as "L component") and the right half includes only the high frequency band component (abbreviated as "H component"). These regions are frequency spaces (Wavelet spaces) divided for each frequency band by the Wavelet transformation. Namely, the left half of FIG. 14A is a space of the L component (L space) and the right half thereof is a space of the H component (H space). In each step of the Wavelet transformation described below, too, the frequency spaces are represented in the same notational manner.

Next, vertical Wavelet transformation is performed. The two types of signals from the horizontal Wavelet transformation unit 23X, i.e., the L component and the H component, are transmitted to the vertical Wavelet transformation unit 23Y. Then, after LPF 37L, HPF 37H, LPF 38L, and HPF 38H each perform a vertical-direction subband-division processing, down samplers 39 perform the processing of thinning out the data in the similar manner. The LPF 37L, the HPF 37H, the LPF 38L, and the HPF 38H are also configured by the Haar Wavelet functions This vertical Wavelet transformation outputs the following four types of signal components: A signal component that is a low frequency component including a direct current component in both the horizontal direction and the vertical direction (DC component), a signal component that is a low frequency component in the horizontal direction and is a high frequency component in the vertical direction (LH component), a signal component that is a high frequency component in the horizontal direction and is a low frequency component in the vertical direction (HL component), and a signal component that is a high frequency component in both the horizontal direction and the vertical direction (HH component).

Figure 14B:
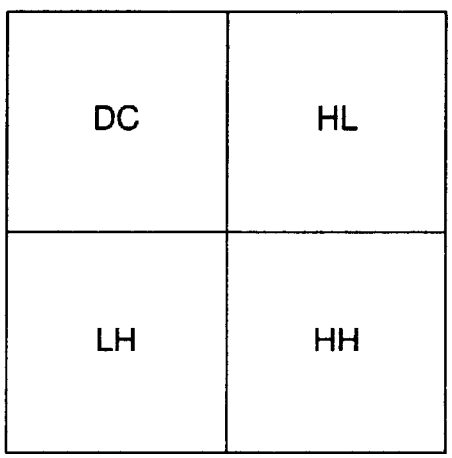

As a result of this, as illustrated in FIG. 14B, the L space and the H space illustrated in FIG. 14A are divided into DC space, LH space, HL space, and HH space that are spaces of the DC component alone, the LH component alone, the HL component alone, and the HH component alone, respectively. By executing the horizontal Wavelet transformation and the vertical Wavelet transformation as a combined single set in this way, the 1st stage Wavelet transformation is terminated. The Wavelet-transformed Wavelet transformation data is stored into the Wavelet-transformed data storing unit 24 in a state of being divided for each frequency band. Consequently, it turns out that the Wavelet transformation member 23 is a band dividing member that frequency-converts the image data of the cell image so as to band-divide the resultant frequency component into the high-frequency-side frequency components (the HH component, the HL component, and the LH component) and the low-frequency-side frequency component including the direct current component (the DC component). The band-divided cell image is stored in the Wavelet-transformed data storing unit 24 as the Wavelet transformation data.

This Wavelet transformation usually does not accomplish its object in its one stage alone, and in most cases, the multistage transformation processing is performed. Namely, the DC component out of the Wavelet transformation data stored in the Wavelet-transformed data storing unit 24 is feedbacked to the Wavelet transformation member 23, and the Wavelet transformation is performed again toward the feedback signal.

Figure 14C:
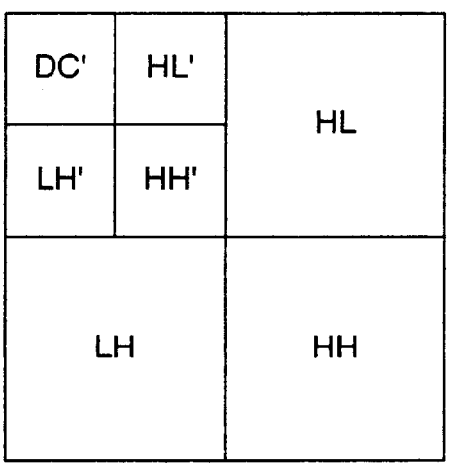

As a result of this 2nd stage Wavelet transformation, the DC space in the state illustrated in FIG. 14B where the 1st stage Wavelet transformation has been performed (state in the stage 0) is divided into four Wavelet spaces, i.e., DC' space, HL' space, LH' space, and HH' space in the stage 1 representing the state illustrated in FIG. 14C where the 2nd stage Wavelet transformation has been finished. Namely, the DC component is band-divided into the high-frequency-side frequency components (HH' component, HL' component, and LH' component) and the low-frequency-side frequency component including the direct current component (the DC' component). In the present embodiment, an example is given where a still further Wavelet transformation is performed toward the DC' space in the state in the stage 1.

Namely, as a result of this, as illustrated in FIG. 15, the DC' space is further divided into four spaces, i.e., LH" space, HL" space, HH" space, and DC" space (stage 2). Moreover, as illustrated in FIG. 16, each of these Wavelet spaces is divided into a high frequency component space 40 (a summation of HL space, LH space, and HH space illustrated in FIG. 15), an immediate frequency component space 41 (a summation of HL' space, LH' space, and HH' space illustrated in FIG. 15), a low frequency component space 42 (a summation of LH" space, HL" space, and HH" space illustrated in FIG. 15), and a direct current component space 43 (DC" space). The direct current component space 43, which, accurately speaking, includes a frequency component lower than the low frequency component space 42, turns out to be a low frequency component space including the direct current component.

In FIG. 11, the inverse Wavelet transformation member 25 inverse-Wavelet-transforms the Wavelet-transformed signal stored in the Wavelet-transformed data storing unit 24. The inverse Wavelet transformation, which is an inverse transformation of the above-described Wavelet transformation, is a processing of restoring the image signal, which has been transformed into the space frequency and subband-divided, back to the image data before the transformation, i.e., the image signal indicated by the luminance data for each pixel.

Figure 19A:
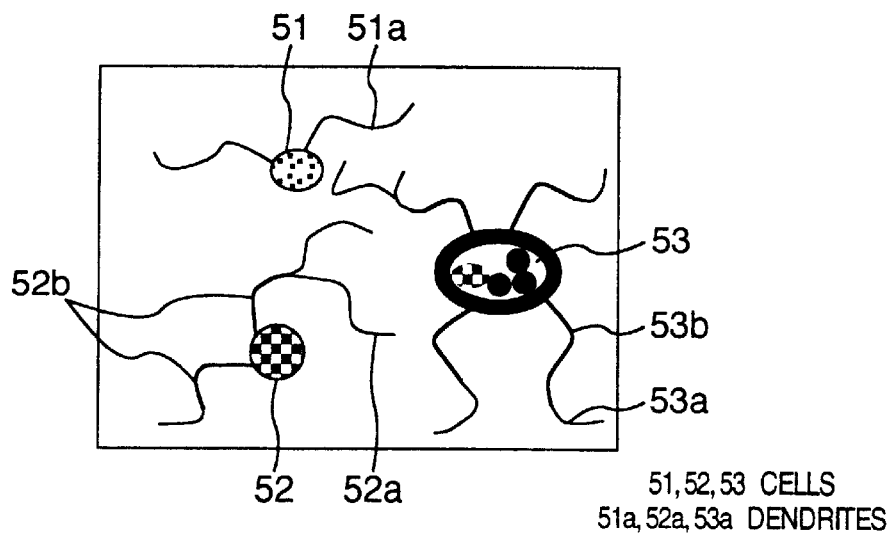
FIGS. 19A to 19C are diagrams for illustrating cell images by the image analyzing apparatus according to the embodiment 2 of the present invention.

Here, there are indicated examples of processed images in which the Wavelet transformation and the inverse Wavelet transformation are applied to the image analysis of cell images. FIG. 19A indicates an original image of a microscopic image of animal and plant cells. Referring to FIGS. 19B and 19C, FIGS. 20A and 20B, and FIGS. 21A to 21C, the explanation will be given below concerning an image restored by inverse-Wavelet-transforming a Wavelet-transformed signal divided for each frequency band by Wavelet-transforming this original image.

Figure 21A:
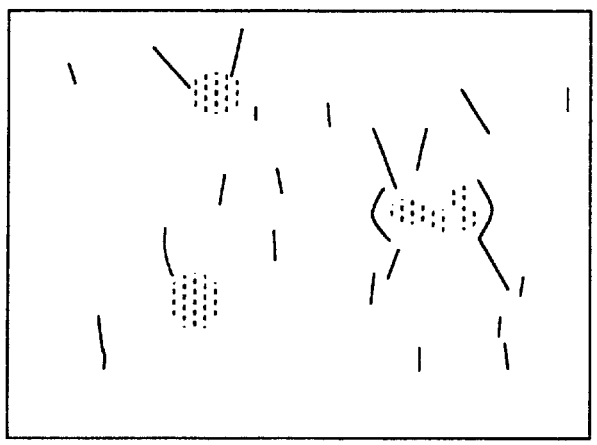
FIGS. 21A to 21C are diagrams for illustrating cell images by the image analyzing apparatus according to the embodiment 2 of the present invention.
Figure 21B:
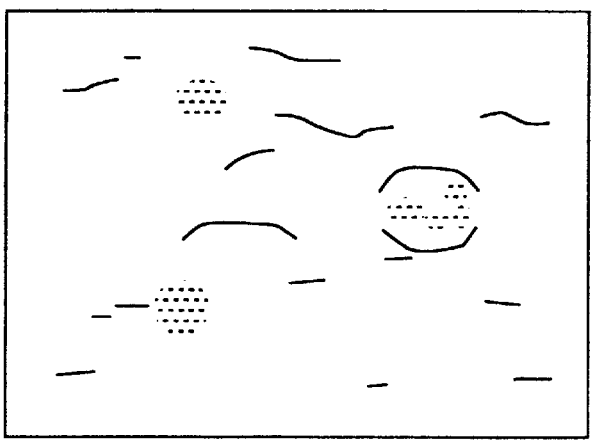
Figure 21C:
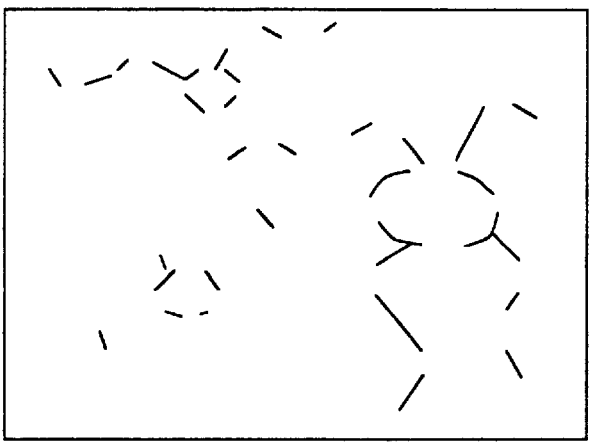

First, FIGS. 21A to 21C illustrate images that visually represent only the frequency components of the HL space, the LH space, and the HH space illustrated in FIG. 15, respectively. As understood from FIGS. 21A to 21C, the HL space, the LH space, and the HH space each indicate image elements configured by the high frequency components in the original image, i.e., an edge component in the horizontal direction, an edge component in the vertical direction, and an edge component in the oblique direction of the elements that exhibit a higher density on the image and appear in a line-shaped configuration.

Figure 19B:
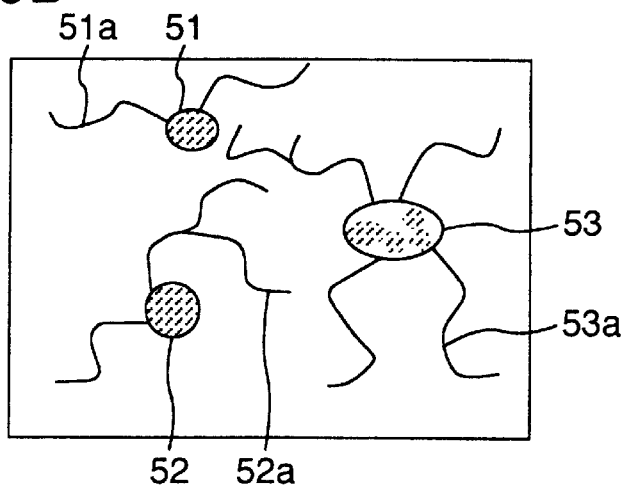

Also, FIG. 19B corresponds to an image represented visually by superimposing the three components in FIGS. 21A to 21C, i.e., the high frequency component space 40 (the summation of the HL space, the LH space, and the HH space) illustrated in FIG. 16. In the image in FIG. 19B, there appear image elements such as dendrites configured by the high frequency components.

Figure 19C:
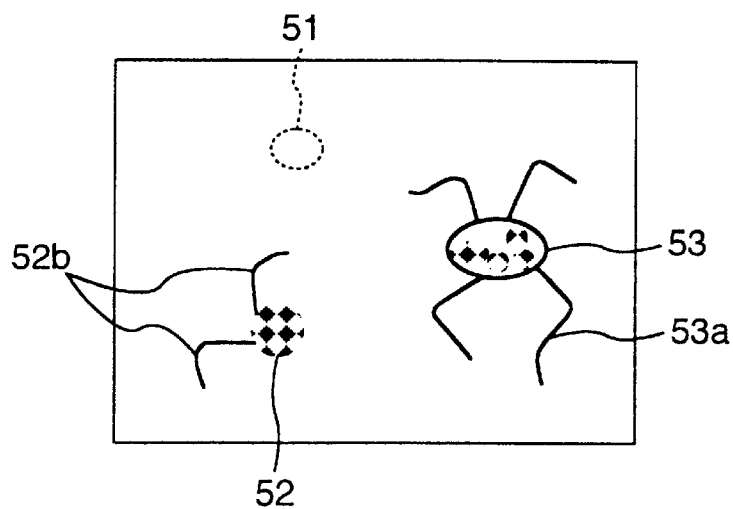
Figure 20A:
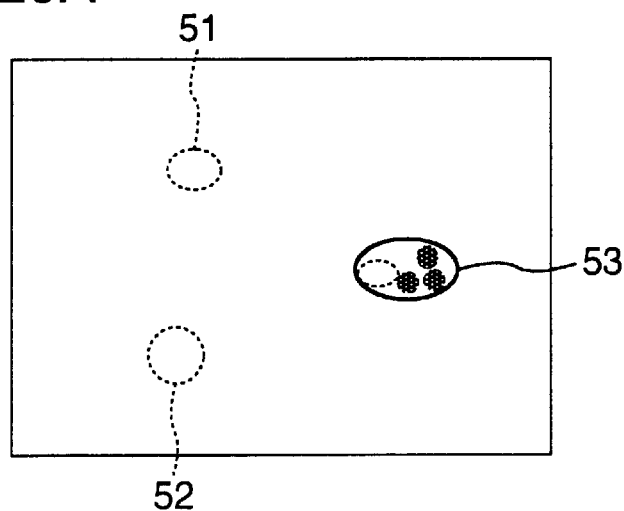
FIGS. 20A to 20C are diagrams for illustrating cell images by the image analyzing apparatus according to the embodiment 2 of the present invention.
Figure 20B:
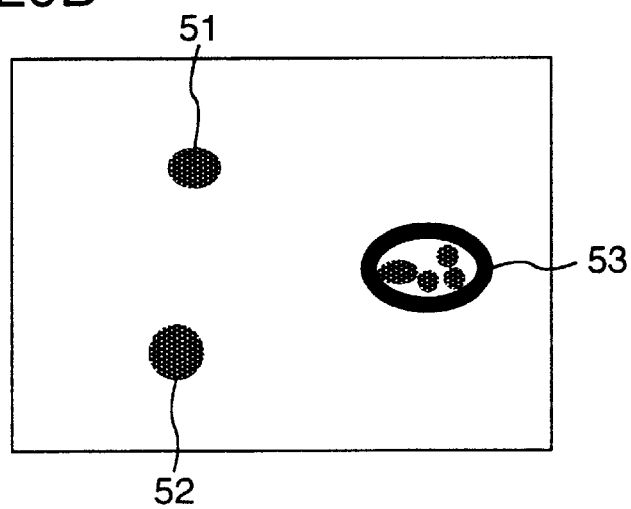
Figure 20C:
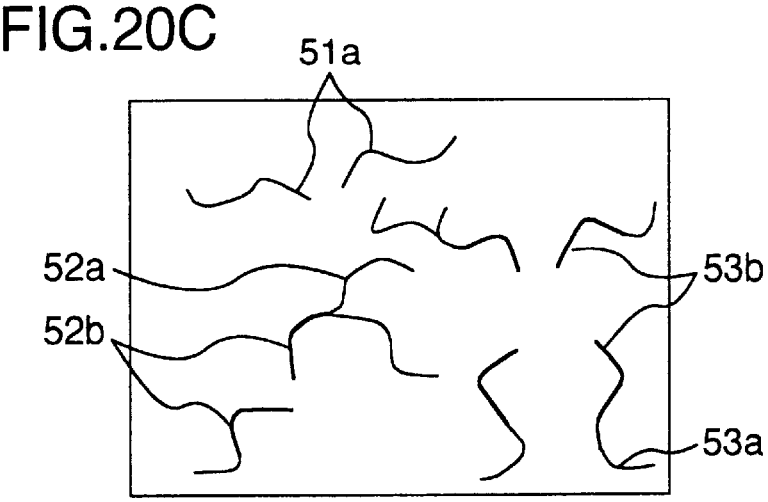

Furthermore, FIG. 19C and FIGS. 20A and 20B illustrate images that visually represent the frequency components of the immediate frequency component space 41, the low frequency component space 42, and the direct current component space 43 illustrated in FIG. 16, respectively. Namely, as the space frequency is getting lowered, there remain portions of the low-density images that vary less.

In this way, as the consequence of Wavelet-transforming a cell image of a cell having dendrites, many of the image elements indicating features of the dendrites remain in the high-frequency-side frequency components, and many of the image elements regarded as unnecessary (noise) remain in the low-frequency-side frequency components. Taking advantage of this kind of characteristic of the Wavelet transformation, in the inverse Wavelet transformation, a processing is performed of eliminating (or making inconspicuous) the low-frequency-side frequency components containing much noise. Concretely, the low-frequency-side frequency components to be eliminated are assumed to be fixed values, and the low-frequency-side frequency components set to be the fixed values, together with the remaining high-frequency-side frequency components, are inputted into the inverse Wavelet transformation member 25, thus performing the inverse Wavelet transformation.

In the present embodiment, as the low-frequency-side frequency components, the low frequency component space 42 are all set to be fixed values, i.e., 0, and the direct current component space 43 is set to be a fixed value other than 0. Then, the low-frequency-side frequency components, together with the remaining high-frequency-side frequency components (the high frequency component space 40, the immediate frequency component space 41) are inputted into the inverse Wavelet transformation member 25, thus performing the inverse Wavelet transformation. This makes it possible to obtain restored image data (intermediate data) from which the direct current component and the low frequency components have been eliminated. Then, the image data restored (the restored image data) are stored into the restored data storing unit 26. Namely, it turns out that the inverse Wavelet transformation member 25 is an intermediate data creating member.

Next, based on the restored image data, the explanation will be given below regarding an analysis processing performed by the analysis processing unit 27. In this analysis processing, using publicly known image processing technologies, the restored image data is image-processed in accordance with an operation instruction inputting from the operation-input unit 18, thereby extracting feature portions of a cell. Namely, the analysis processing unit 27 turns out to be a feature extracting member. As illustrated in FIG. 17, the analysis processing unit 27 includes a dendrite-mycelium extracting unit 45, a coordinate data storing unit 46, a length storing unit 47, and a bifurcation number storing unit 48.

The dendrite-mycelium extracting unit 45 image-processes the restored image data, thereby detecting and extracting each dendrite or mycelium of the cell, i.e., the feature portions of the cell, from the restored image data. In this detection processing, the following are detected: coordinate data for indicating the position of each dendrite or mycelium, data for indicating the length of each dendrite or mycelium, and the number of bifurcations occurring in the line-shaped portion such as the dendrite.

Furthermore, data on the position coordinate (position data) for specifying the position of the detected dendrite or mycelium in the original image is stored in the coordinate data storing unit 46. The use of the position data, when displaying the analysis result on the monitor of the display unit 16, allows the extracted dendrite or mycelium to be display-processed and be clarified with a specified color or line type and, in addition, to be displayed in such a manner as to be superimposed on the original image, thereby making it possible to easily perform the comparison and the identification with the original image at the time of analyzing the analysis result.

In the present embodiment, performing the Wavelet transformation and the inverse Wavelet transformation obtains the restored image data (the intermediate data) in which unnecessary portions other than the dendrites have been almost eliminated from the cell image. Then, the image processing extracts the feature portions of the cell that have remained in the restored image data. This permits a high accuracy extraction result to be obtained in a shorter processing time.

The length storing unit 47 stores numerical data corresponding to the length of the extracted dendrite or mycelium. Namely, the length storing unit stores the numerical data obtained by quantifying, as the number of the pixels of the line-shaped configuration, the length of the dendrite or mycelium characterized by the line-shaped configuration on the image. The bifurcation number storing unit 48 determines and stores the number of the bifurcations of the dendrite or mycelium, i.e., the number of the bifurcation points occurring in the line-shaped portion. These numerical data are outputted at the time of necessity such as the time of analyzing the analysis result.

In accordance with an operation from the operation-input unit 18, the display processing unit 28 displays, on the display unit 16, the analysis result obtained by the analysis processing unit 27 and the cell image stored in the original image storing unit 20. When the operation-input unit 18 issues an instruction of displaying position of the dendrite on the original image, the display processing unit 28 displays the original image on the display unit 16 and further, based on the coordinate data read from the coordinate data storing unit 46, displays, on the original image displayed, a point and a line indicating the position of the dendrite. Accordingly, it turns out that the display processing unit 28 and the display unit 16 are display members of displaying the image based on the position data on the dendrite in a state of being superimposed on the original cell image.

In accordance with an instruction inputting from the operation-input unit 18, the recording unit 29 performs the processing of recording various types of data. The various types data as the object to be recorded include the following: The original image data (the cell image) stored in the original image storing unit 20, the Wavelet-transformed Wavelet transformation data, the restored image data restored by inverse-Wavelet-transforming the Wavelet-transformed data, and the analysis result (the position data and the numerical data on the dendrite) obtained by the analysis processing performed by the analysis processing unit 27. Moreover, when making the analysis result storing unit 30 store the analysis result, at least the following three data are stored in a state where the three data are caused to be related to each other: The analysis result, the original image data (or the compressed image data), and the microscope' magnification at the time of photographing the image.

Causing the data to be related to each other in this way, when analyzing the analysis result, makes it possible to compare the obtained compressed data and dendrite's position data and numerical data with the original image itself by displaying the compressed data and dendrite's position data and numerical data in being superimposed on the original image itself on the monitoring apparatus of the display unit 16 in a state where the magnifications and the relative positions are caused to coincide with each other. This permits the analysis processing to be executed more efficiently and in more detail and accuracy. Also, it is allowable to store the Wavelet transformation data together with the analysis result instead of the original image data. The Wavelet transformation is also a technology used for the image compression processing, and thus the Wavelet transformation data turns out to be the compressed data of the original image. Accordingly, storing the Wavelet-transformed image instead of the original image makes it possible to save the memory capacity in the analysis result storing unit 30.

This image analyzing apparatus is configured as described above, and, following a flow diagram illustrated in FIG. 18, the explanation will be given below regarding the method of analyzing a cell image. First, the container 2, which contains the sample 3 including observation objects such as cells of animals and plants, is mounted on the positioning stage 1. Then, the sample 3 is photographed by the camera 5, thereby fetching the image data including the cell image of the observation objects (ST1). This results in an original image 50 as illustrated in FIG. 19A.

In the original image 50, cells of different configurations 51, 52, and 53 are photographed. Moreover, there are illustrated a thin line-shaped dendrite 51a extending out from the cell 51, dendrites 52a, 52b extending out from the cell 52 and being of different thickness, and dendrites 53a, 53b extending out from the cell 53 and being of different thickness. The image data is stored into the original image storing unit 20.

Next, the Wavelet transformation member 23 executes the Wavelet transformation toward the image data (ST2). This subband-divides the image data, then being stored into the Wavelet-transformed data storing unit 24 for each frequency band. This Wavelet transformation is repeated predetermined times. Namely, the data in the DC space (the DC component) out of the data stored in the Wavelet-transformed data storing unit 24 after the transformation processing is read into the Wavelet transformation member 23, and the Wavelet transformation is executed again.

Next, taking advantage of these Wavelet-transformed data, the processing is executed of determining the intermediate data used for performing the analysis processing of the cell image. Namely, out of the Wavelet-transformed data, the low frequency components are set to be 0 and the direct current component is set to be a fixed value other than 0 (for example, 128), then executing the inverse Wavelet transformation (ST3).

This inverse Wavelet transformation is a processing of restoring, back to the original image, the image signal that has been frequency-converted and subjected to the subband-encoding processing by the Wavelet transformation. In this inverse Wavelet transformation, the low frequency components are assumed to be 0 and the direct current component is assumed to be the fixed value other than 0. This operation allows the restored image to be obtained.

The low frequency components are set to be 0 and, as a result of this, a portion included in an image illustrated in FIG. 20A does not appear in the restored image. Also, the direct current component is set to be the fixed value other than 0 and, as a result of this, the light and shade of an image illustrated in FIG. 20B is eliminated and the image becomes a mere background image having a luminance corresponding to the fixed value. Then, in the inverse Wavelet transformation, the low frequency components are set to be 0 and the direct current component is set to be the fixed value other than 0, thereby obtaining the restored image illustrated in FIG. 20C.

Namely, this restored image has turned out to become an image that results from extracting the dendrites 51a, 52a, 52b, 53a, and 53b, i.e., the feature portions of the extraction object, from the original image illustrated in FIG. 19A. The restored image data (the intermediate data) restored by the inverse Wavelet transformation in this way are stored in the restored data storing unit 26.

Next, in accordance with the instruction inputting from the operation-input unit 18, the analysis processing is executed (ST4). Namely, after the processing is performed of eliminating the noise component from the above-mentioned restored image, the following processings are executed, respectively: Detecting the position of the dendrite portion and storing the coordinate data into the coordinate data storing unit 46, determining the data corresponding to the length of the detected dendrite and storing the data into the storing unit 47, and searching the dendrite on the image to detect the bifurcation portions and counting the number of the detected bifurcation portions to store the number into the bifurcation number storing unit 48.

Next, the analysis result is stored (ST5). Namely, the analysis result is display-processed by the display processing unit 28 so as to be displayed on the display unit 16, and at the same time the analysis result is stored into the analysis result storing unit 30 after being caused to be related to the original image data and the microscope' magnification data by the recording unit 29, thus terminating the analysis processing of the cell image.

When analyzing the analysis result, the data stored in the analysis result storing unit 30 are read out, then being displayed on the display unit 16. At this time, it is possible to display the thin line-shaped portion as the observation object, such as the dendrite or the mycelium, in such a manner as to be superimposed on the original image, and at the same time it is possible to display the quantification data such as the data corresponding to the length of the observation object or the number of the bifurcations thereof. This condition permits confirmation of the analysis to be performed with a high efficiency.

In this way, according to the analysis processing of the cell image illustrated in the above-described embodiment, the image data of the cell image is frequency-converted so as to band-divide the frequency component into the high-frequency-side frequency components and the low-frequency-side frequency component that contains the direct current component. Then, the feature portions of the animal or plant cell are extracted from the feature-extracting intermediate data created using at least the high-frequency-side frequency components. This operation makes it possible to separate and extract, with a high accuracy, the feature portions corresponding to the high frequency components in the image signal, i.e., each dendrite or the mycelium in the cell image.

Also, the Wavelet transformation is applied to the above-described analysis processing. This allows the position information to be stored without being damaged and deteriorated in the step of the transformation processing, thus making it possible to obtain the analysis result that is superior in the position accuracy. Moreover, when restoring the image by inverse-Wavelet-transforming the Wavelet-transformed data that has been frequency-converted and subjected to the subband-encoding processing by the Wavelet transformation, only the specific frequency components are set to a fixed value. This makes it possible to separate and extract, with a high accuracy and in a selective manner, only the portion corresponding to the specific frequency such as the dendrite in the cell image.

Also, in the processing of extracting the dendrite from the cell image, the numerical data indicating length of the dendrite and the number of bifurcations of the dendrite are detected and outputted simultaneously. This makes it possible to automate and quantify the observation operation of the cell image, the data sampling, and the recording operation that, conventionally, have been entirely carried out by a visual inspection. As a result, it becomes possible to enhance the operation efficiency and to exclude variation of the data caused by a difference in the personal ability and experience of each person in charge of the observation, thereby being capable of ensuring a reliability in the analysis result.

Furthermore, in the above-mentioned processing of extracting the dendrite, the position data on the dendrite in the original image have been determined and stored. This makes it possible to display the dendrite, which has been extracted based on the position data, in a state of being superimposed on the cell image at the time of analyzing the analysis result, thus allowing the analyzing operation to be executed with a high efficiency.

Also, the programs of executing the above-mentioned respective processings have been stored in a portable storage medium and, from this portable storage medium, these programs and the cell image data are read into a general personal computer. This permits the personal computer to function as an image analyzing apparatus.

Embodiment 3

Figure 22:
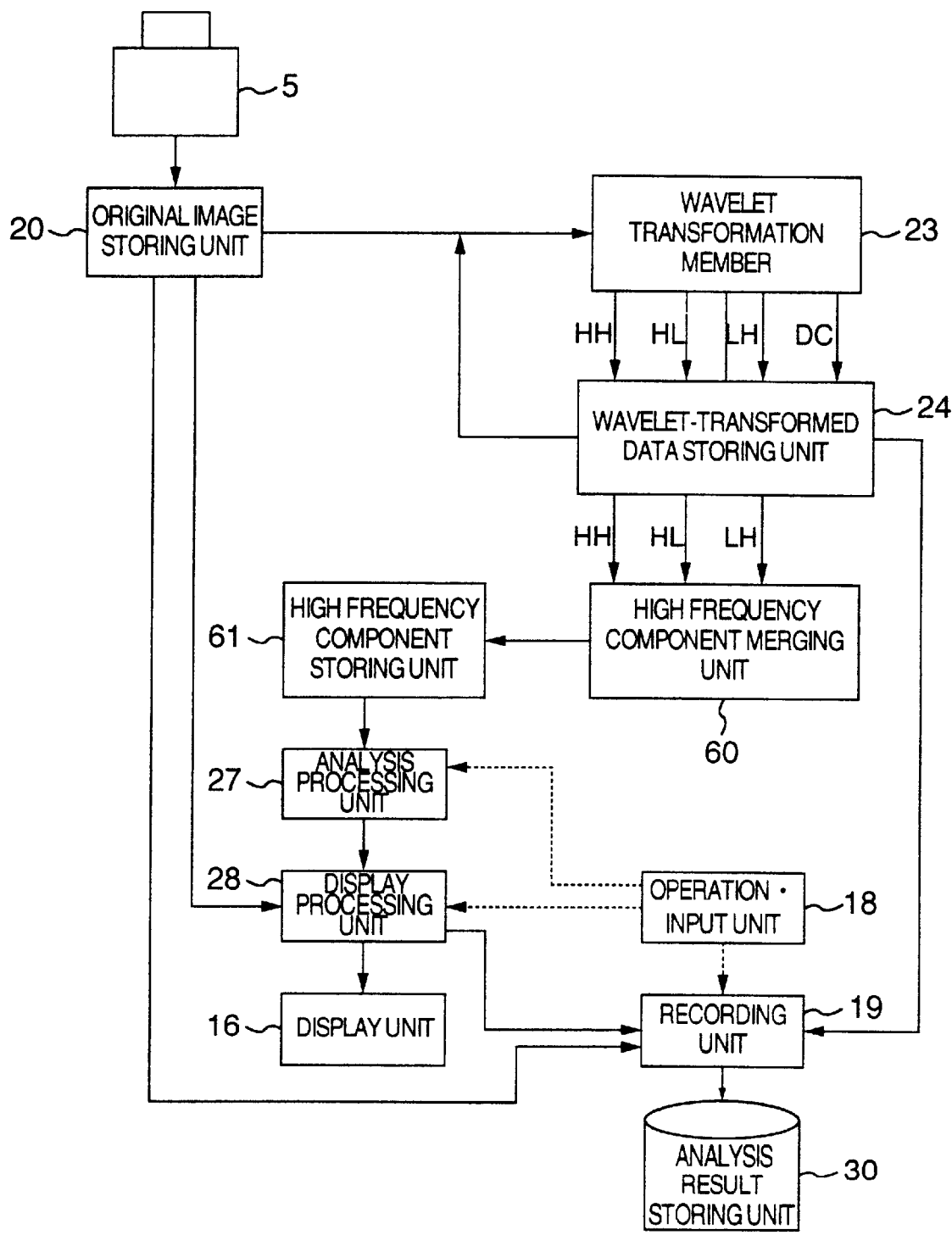
FIG. 22 is a function block diagram for illustrating the processing functions of an image analyzing apparatus according to an embodiment 3 of the present invention.
Figure 23:
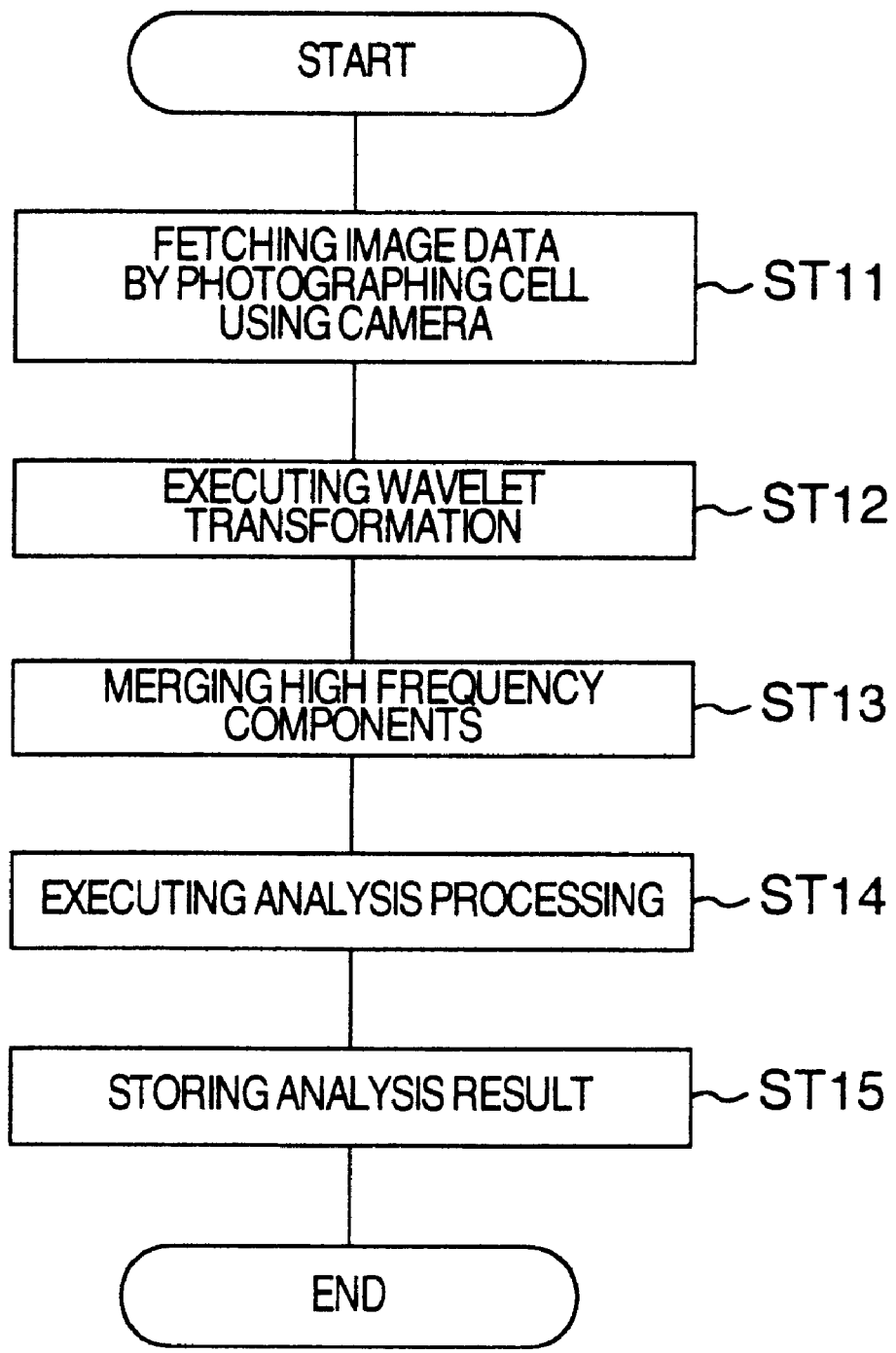
FIG. 23 is a flow diagram for illustrating an image analyzing method in the embodiment 3 of the present invention.
Figure 24A:
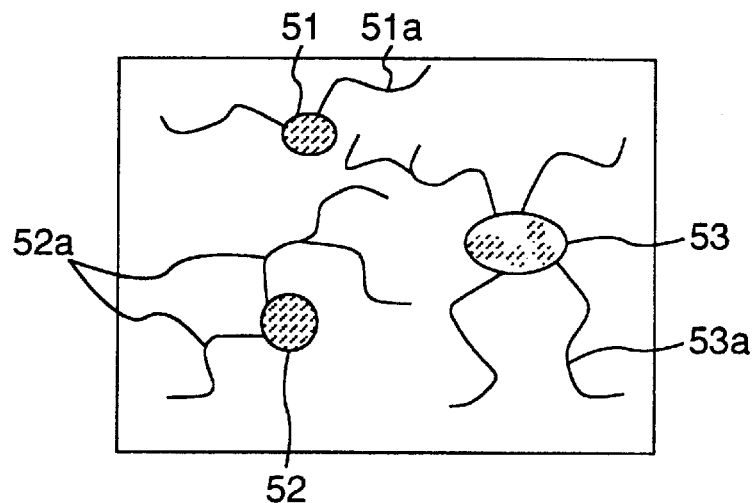
FIGS. 24A to 24C are diagrams for illustrating cell images by the image analyzing apparatus according to the embodiment 3 of the present invention.
Figure 24B:
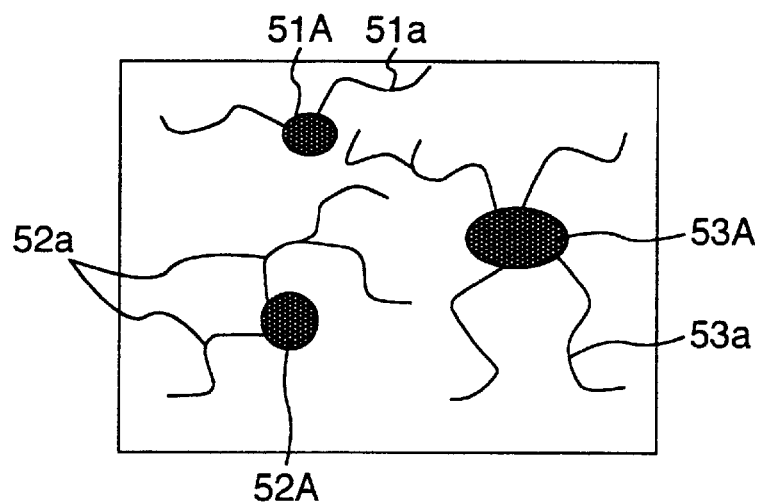
Figure 24C:
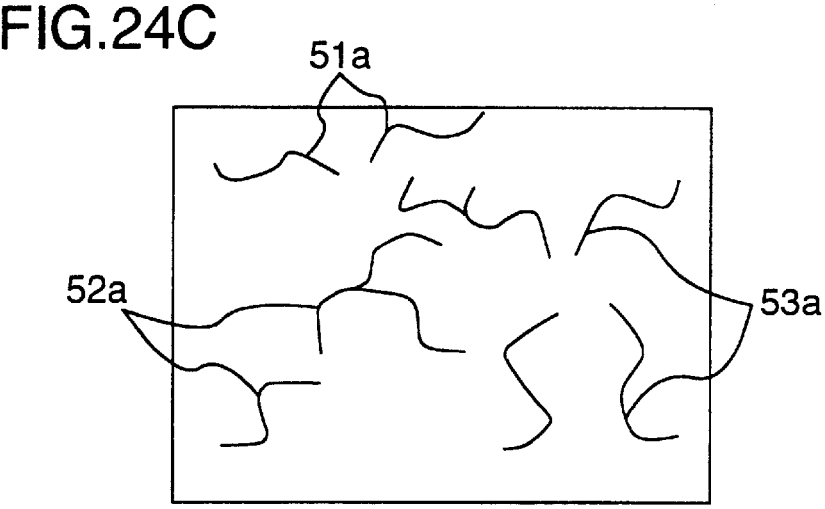

FIG. 22 is a function block diagram for illustrating the processing functions of an image analyzing apparatus according to an embodiment 3 of the present invention. FIG. 23 is a flow diagram for illustrating an image analyzing method in the embodiment 3 of the present invention. FIGS. 24A to 24C are diagrams for illustrating cell images by the image analyzing apparatus according to the embodiment 3 of the present invention. In the present embodiment 3, in the processing of creating the feature portion-extracting intermediate data from the Wavelet-transformed image signal, the dendrite is extracted from the original image using only the high frequency components after the Wavelet transformation.

Of configuration components illustrated in FIG. 22, concerning the same configuration components as those of the embodiment 2 illustrated in FIG. 11, the same reference numerals are given thereto and the explanation thereof will be omitted. In the present embodiment 3, in the processing of determining, from the Wavelet-transformed image signal, the intermediate data for performing the analysis processing of extracting the feature portions of the cell image, there is employed a method of merging the high frequency components (the HH component, the HL component, and the LH component).

Namely, here, the intermediate data are created using only the high frequency components. As illustrated in FIG. 22, this processing is executed by a high frequency component merging unit 60. The merged data of the high frequency components is stored into a high frequency component storing unit 61. Moreover, the analysis processing unit 27 performs the analysis processing in accordance with this data.

Following the flow diagram in FIG. 23, the explanation will be given below regarding the analysis processing of the cell image. Here, processins at (ST11) and (ST12) are the same as those at (ST1) and (ST2) in the embodiment 2, and accordingly the explanation thereof will be omitted. Next, there are merged the high frequency components obtained by the Wavelet transformation (ST13). In this processing, there are merged the high frequency components HL, LH, and HH shown in FIG. 15. This operation, in the real images, corresponds to the merging of the images illustrated in FIGS. 21A to 21C, i.e., the merging of the edge component in the horizontal direction, the edge component in the vertical direction, and the edge component in the oblique direction. FIG. 24A illustrates an image that has been merged in this way. This image data is stored in the high frequency component storing unit 61. In the image obtained by merging the high frequency components, there remains much information indicating the dendrites. The unnecessary portions (noise) indicated by the low-frequency-side frequency component have been eliminated.

Next, based on this data, the analysis processing unit 27 performs the analysis processing. Here, a processing is performed first of eliminating cell portions 51A, 52A, and 53A from the image illustrated in FIG. 24A. Here, since the cell portions 51A, 52A, and 53A correspond to low-density portions on the image, depending on the extent of the density of the image, only the cell portions 51A, 52A, and 53A are separated as illustrated in FIG. 24B.

Eliminating the cell portions 51A, 52A, and 53A from the image illustrated in FIG. 24A brings about an image for the analysis processing illustrated in FIG. 24C, i.e., an image that results from extracting the dendrites 51$a$, 52$a$, and 53$a$ from the original image. Furthermore, based on this image data for the analysis processing, in much the same way as in the embodiment 2, the analysis processing is executed (ST14), the analysis result is stored (ST15), thus terminating the analysis processing of the cell image. The embodiment 3 also makes it possible to obtain the same effects as those in the example illustrated in the embodiment 2.

Incidentally, in the separation processing of the cell portion for merging the high frequency components so as to extract from the original image only the dendrite portions corresponding to the high frequency components, it is allowable to employ a method of separating the cell portion in accordance with the transformation coefficients, i.e., the Wavelet-transformed image signals. In this method, the Wavelet-transformed frequency space is divided into regions, and the cell portion is identified and separated based on distribution of the transformation coefficients concerning these regions.

Also, in the embodiment 2 and the embodiment 3, the explanation has been given above with the Wavelet transformation employed as an example of the band dividing member. Other than the Wavelet transformation, however, it is allowable to employ transformations such as Hadamard transformation, discrete cosine transformation (DCT), and Fourier transformation.

The present invention allows the automatic quantitative judgement on the analysis of the following factors: The position, the number, the magnitude, the degree of activity, the area ratio, the configuration, the direction, and the color of the information having specific features in the image data. This makes it possible to reduce a burden imposed on a person who are in charge of the observation.

Also, the noise can be eliminated, which also enhances the analyzing performance.

Also, the analysis is executed with the amount of calculation that is smaller than the resolution, thereby allowing the high-speed processing to be implemented.

What is claimed is:

1. An image analyzing apparatus, comprising:

an image inputting section that inputs an image to be analyzed, a frequency conversion section that performs a frequency conversion toward said image inputted by said image inputting section, an output section that outputs based on a conversion result, an analysis result of said image inputted from said image inputting section, said conversion result being obtained by said frequency conversion section, and an image rotation section that rotates said image inputted from said image inputting section, wherein said frequency conversion is performed by said frequency converting section toward said image data rotated by said image rotation section, and sum-totals of said frequency-converted data in horizontal and vertical regions are taken, respectively, and from a ratio between said respective sum-totals, a quantitative judgement is performed concerning a flattening ratio of a configuration within said inputted image.

2. An image analyzing method, comprising the steps of:

performing a frequency conversion toward an image inputted from an image inputting means, outputting, based on a conversion result, an analysis result of said image inputted from said image inputting means, said conversion result being obtained by said frequency conversion, rotating said image inputted from said image inputting means, performing said frequency conversion toward said image data rotated, taking sum-totals of said frequency-converted data in horizontal and vertical regions, respectively, and from a ratio between said respective sum-totals, performing a quantitative judgement concerning a flattening ratio of a configuration within said inputted image.

* * * * *